(12) United States Patent
Finn et al.

(10) Patent No.: US 11,416,728 B2
(45) Date of Patent: Aug. 16, 2022

(54) DURABLE DUAL INTERFACE METAL TRANSACTION CARDS

(71) Applicant: Federal Card Services, LLC, Cincinnati, OH (US)

(72) Inventors: David Finn, Füssen Weissensee (DE); Daniel Pierrard, Newport, KY (US); Alex Sanchez, Cincinnati, OH (US)

(73) Assignee: Federal Card Services, LLC, Cincinnati, OH (US)

(*) Notice: Subject to any disclaimer, the term of this patent is extended or adjusted under 35 U.S.C. 154(b) by 0 days.

(21) Appl. No.: 17/019,378

(22) Filed: Sep. 14, 2020

(65) Prior Publication Data

US 2021/0117744 A1 Apr. 22, 2021

Related U.S. Application Data

(63) Continuation-in-part of application No. 16/994,558, filed on Aug. 15, 2020, now Pat. No. 11,113,593.
(Continued)

(51) Int. Cl.
*G06K 19/07* (2006.01)
*G06K 19/04* (2006.01)
(Continued)

(52) U.S. Cl.
CPC .......... *G06K 19/0726* (2013.01); *B23K 26/53* (2015.10); *G06K 19/045* (2013.01); *G06K 19/07722* (2013.01); *G06K 19/07754* (2013.01)

(58) Field of Classification Search
CPC ............. G06K 19/0726; G06K 19/045; G06K 19/07754; G06K 19/07722;
(Continued)

(56) References Cited

U.S. PATENT DOCUMENTS 5,550,402 A 8/1996 Nicklaus
5,855,969 A 1/1999 Robertson et al.
(Continued)

FOREIGN PATENT DOCUMENTS

WO WO2019/173455 9/2019

OTHER PUBLICATIONS

Plastic Overview, Spirol International Corporation, Apr. 2020, 2 pages.
(Continued)

*Primary Examiner* — Seung H Lee
(74) *Attorney, Agent, or Firm* — Michael D. Eisenberg

(57) ABSTRACT

Apparatus and method for producing contact, contactless and dual-interface metal transaction cards that provides enhanced durability and aesthetics, with increased production efficiency. The cards may include (i) a metal core subassembly comprising a metal layer or layers (metal inlay) having a slit (S) allowing for contactless functionality, and (ii) a UV hard coat on a release-carrier layer disposed on one or both sides of the metal core subassembly, and (iii) everything may be laminated together in a single step, providing a metal face smartcard. The hard coat provides a durable, scratch-resistant surface, and protects underlying layers while allowing the passage of a laser beam to write on or within the underlying layer(s), such as a transparent laser-reactive layer. Techniques for hiding or camouflaging the slit provide a more aesthetically pleasing appearance to the metal transaction card.

16 Claims, 19 Drawing Sheets

Related U.S. Application Data

(60) Provisional application No. 63/053,559, filed on Jul. 17, 2020, provisional application No. 63/040,544, filed on Jun. 18, 2020, provisional application No. 63/004,491, filed on Apr. 2, 2020, provisional application No. 62/979,440, filed on Feb. 21, 2020, provisional application No. 62/971,927, filed on Feb. 8, 2020, provisional application No. 62/969,034, filed on Feb. 1, 2020, provisional application No. 62/964,138, filed on Jan. 22, 2020, provisional application No. 62/960,178, filed on Jan. 13, 2020, provisional application No. 62/946,990, filed on Dec. 12, 2019, provisional application No. 62/936,453, filed on Nov. 16, 2019, provisional application No. 62/933,526, filed on Nov. 11, 2019, provisional application No. 62/932,506, filed on Nov. 8, 2019, provisional application No. 62/927,157, filed on Oct. 29, 2019, provisional application No. 62/925,255, filed on Oct. 24, 2019, provisional application No. 62/914,485, filed on Oct. 13, 2019, provisional application No. 62/912,701, filed on Oct. 9, 2019, provisional application No. 62/912,077, filed on Oct. 8, 2019, provisional application No. 62/911,236, filed on Oct. 5, 2019, provisional application No. 62/900,566, filed on Sep. 15, 2019, provisional application No. 62/891,433, filed on Aug. 26, 2019, provisional application No. 62/886,978, filed on Aug. 15, 2019.

(51) Int. Cl.
*B23K 26/53* (2014.01)
*G06K 19/077* (2006.01)

(58) Field of Classification Search
CPC ....... G06K 19/07749; G06K 19/07769; G06K 19/06187; G06K 19/07743; G06K 19/02; B23K 26/53
See application file for complete search history.

(56) References Cited

U.S. PATENT DOCUMENTS

| | | |
|---|---|---|
| 6,007,929 A | 12/1999 | Robertson et al. |
| 6,133,342 A | 10/2000 | Mizobuchi et al. |
| 6,210,472 B1 | 4/2001 | Kwan et al. |
| 6,261,348 B1 | 7/2001 | Kwan et al. |
| 6,491,229 B1 | 12/2002 | Berney |
| 6,617,515 B1 | 9/2003 | Yeung |
| 6,644,552 B1 | 11/2003 | Herslow |
| 6,749,123 B2 | 6/2004 | Lasch et al. |
| 6,843,422 B2 | 1/2005 | Jones et al. |
| 7,048,823 B2 | 5/2006 | Bermel |
| 7,187,396 B2 | 3/2007 | Carroll, Jr. et al. |
| 7,207,494 B2 | 4/2007 | Theodossiou et al. |
| 7,278,580 B2 | 10/2007 | Jones et al. |
| 7,287,704 B2 | 10/2007 | Herslow |
| 7,306,163 B2 | 12/2007 | Scholz et al. |
| 7,544,266 B2 | 6/2009 | Herring et al. |
| 8,393,547 B2 | 3/2013 | Kiekhaefer et al. |
| 8,672,232 B2 | 3/2014 | Herslow |
| 9,024,763 B2 | 5/2015 | Hamedani |
| 9,033,250 B2 | 5/2015 | Finn et al. |
| 9,112,272 B2 | 8/2015 | Finn et al. |
| 9,269,032 B2 | 2/2016 | Zlotnik et al. |
| 9,299,020 B2 | 3/2016 | Zimmerman et al. |
| 9,390,363 B1 | 7/2016 | Herslow et al. |
| 9,390,364 B2 | 7/2016 | Finn et al. |
| 9,390,366 B1 | 7/2016 | Herslow et al. |
| 9,440,481 B1 | 9/2016 | Thomson et al. |
| 9,475,086 B2 | 10/2016 | Finn et al. |
| 9,489,613 B2 | 11/2016 | Finn et al. |
| 9,542,635 B2 | 1/2017 | Herslow |
| 9,569,718 B2 | 2/2017 | Herslow |
| 9,622,359 B2 | 4/2017 | Finn et al. |
| 9,634,391 B2 | 4/2017 | Finn et al. |
| 9,646,234 B1 | 5/2017 | Thomson et al. |
| 9,697,459 B2 | 7/2017 | Finn et al. |
| 9,721,200 B2 | 8/2017 | Herslow et al. |
| 9,760,816 B1 | 9/2017 | Troy et al. |
| 9,798,968 B2 | 10/2017 | Finn et al. |
| 9,812,782 B2 | 11/2017 | Finn et al. |
| D804,569 S | 12/2017 | Williams et al. |
| 9,836,684 B2 | 12/2017 | Finn et al. |
| 9,836,687 B1 | 12/2017 | Troy et al. |
| 9,898,699 B2 | 2/2018 | Herslow et al. |
| D812,685 S | 3/2018 | Williams et al. |
| D813,301 S | 3/2018 | Williams et al. |
| 9,960,476 B2 | 5/2018 | Finn et al. |
| D827,026 S | 8/2018 | Williams et al. |
| 10,089,570 B2 | 10/2018 | Herslow et al. |
| 10,140,569 B2 * | 11/2018 | Kim ................ G06K 19/07722 |
| 10,193,211 B2 | 1/2019 | Finn et al. |
| 10,248,902 B1 | 4/2019 | Finn et al. |
| 10,248,903 B2 | 4/2019 | Troy et al. |
| 10,275,703 B2 | 4/2019 | Herslow et al. |
| 10,289,944 B2 | 5/2019 | Herslow et al. |
| 10,311,346 B2 | 6/2019 | Herslow |
| 10,318,859 B2 | 6/2019 | Lowe et al. |
| 10,332,846 B2 | 6/2019 | Herslow |
| 10,373,920 B2 | 8/2019 | Herslow |
| 10,395,153 B2 | 8/2019 | Herslow |
| 10,406,734 B2 | 9/2019 | Lowe |
| 10,427,446 B2 | 10/2019 | Staub et al. |
| 10,445,636 B2 | 10/2019 | Virostek et al. |
| 10,452,967 B2 | 10/2019 | Herslow et al. |
| 10,479,130 B2 | 11/2019 | Herslow et al. |
| 10,518,518 B2 | 12/2019 | Finn et al. |
| 10,534,990 B2 | 1/2020 | Lowe et al. |
| 10,583,683 B1 | 3/2020 | Ridenour et al. |
| 10,599,972 B2 | 3/2020 | Finn et al. |
| 10,679,113 B2 | 6/2020 | Herslow et al. |
| 10,762,412 B2 | 9/2020 | Lowe et al. |
| 10,552,722 B2 | 10/2020 | Finn et al. |
| 2005/0003297 A1 | 1/2005 | Labrec |
| 2005/0040243 A1 | 2/2005 | Daoshen et al. |
| 2005/0095408 A1 | 5/2005 | Labrec et al. |
| 2008/0124498 A1 | 5/2008 | Cole et al. |
| 2008/0296887 A1 | 12/2008 | Baggenstos |
| 2010/0116891 A1 | 5/2010 | Yano et al. |
| 2012/0325914 A1 | 12/2012 | Herslow |
| 2013/0126622 A1 | 5/2013 | Finn |
| 2015/0021403 A1 | 1/2015 | Finn et al. |
| 2015/0269477 A1 | 9/2015 | Finn et al. |
| 2015/0339564 A1 * | 11/2015 | Herslow ................ B32B 9/04 235/488 |
| 2016/0229081 A1 | 8/2016 | Troy et al. |
| 2016/0232438 A1 | 8/2016 | Troy et al. |
| 2017/0098151 A1 | 4/2017 | Herslow et al. |
| 2017/0316300 A1 | 11/2017 | Herslow et al. |
| 2017/0344869 A1 | 11/2017 | Troy et al. |
| 2017/0344870 A1 | 11/2017 | Troy et al. |
| 2018/0068212 A1 | 3/2018 | Williams et al. |
| 2018/0341846 A1 | 3/2018 | Finn et al. |
| 2018/0129927 A1 | 5/2018 | Herslow et al. |
| 2018/0197062 A1 | 7/2018 | Herslow et al. |
| 2018/0330214 A1 | 11/2018 | Gao et al. |
| 2018/0339503 A1 | 11/2018 | Finn et al. |
| 2018/0341847 A1 | 11/2018 | Finn et al. |
| 2018/0349751 A1 | 12/2018 | Herslow et al. |
| 2019/0392283 A1 | 1/2019 | Finn et al. |
| 2019/0050706 A1 | 2/2019 | Lowe |
| 2019/0114526 A1 | 4/2019 | Finn et al. |
| 2019/0171923 A1 | 6/2019 | Finn |
| 2019/0197386 A1 | 6/2019 | Finn et al. |
| 2019/0236434 A1 | 8/2019 | Lowe |
| 2019/0286961 A1 | 9/2019 | Lowe |
| 2019/0311235 A1 | 10/2019 | Sexl et al. |
| 2019/0311236 A1 | 10/2019 | Sexl et al. |
| 2019/0332907 A1 | 10/2019 | Herslow |

(56) References Cited

U.S. PATENT DOCUMENTS

| | | |
|---|---|---|
| 2019/0354825 A1 | 11/2019 | Lowe |
| 2019/0378805 A1 | 12/2019 | Herslow |
| 2020/0005114 A1 | 1/2020 | Finn et al. |
| 2020/0034578 A1 | 1/2020 | Finn et al. |
| 2020/0039280 A1 | 2/2020 | Herslow et al. |
| 2020/0050914 A1 | 2/2020 | Finn et al. |
| 2020/0151534 A1 | 5/2020 | Finn et al. |

OTHER PUBLICATIONS

T900306, Cast Modified Epoxy Adhesive, GTS Flexible Materials, Feb. 13, 2019, 2pp.
DEVT-008-20, Epoxy Adhesive Pen Tapes, GTS Flexible Materials, Jan. 9, 2020, 2pp.
ENrG_Thin_E-Strate_Ultra-Thin_Flexible_Zirconia_Ceramic, 2 pages.

* cited by examiner (Fig. 4A of US 10,395,153)

DURABLE DUAL INTERFACE METAL TRANSACTION CARDS

CROSS-REFERENCES TO RELATED APPLICATIONS

Priority (filing date benefit) is claimed from the following, incorporated by reference herein:
continuation-in-part of Ser. No. 16/994,558 filed 15 Aug. 2020
   Ser. No. 16/994,558 is a nonprovisional of 62/912,701 filed 9 Oct. 2019
   Ser. No. 16/994,558 is a nonprovisional of 62/891,433 filed 26 Aug. 2019
   Ser. No. 16/994,558 is a nonprovisional of 62/886,978 filed 15 Aug. 2019
nonprovisional of Ser. No. 16/991,142 filed 12 Aug. 2020
nonprovisional of 63/053,559 filed 17 Jul. 2020
nonprovisional of 63/040,544 filed 18 Jun. 2020
nonprovisional of 63/004,491 filed 2 Apr. 2020
nonprovisional of 62/979,440 filed 21 Feb. 2020
nonprovisional of 62/971,927 filed 8 Feb. 2020
nonprovisional of 62/969,034 filed 1 Feb. 2020
nonprovisional of 62/964,138 filed 22 Jan. 2020
nonprovisional of 62/960,178 filed 13 Jan. 2020
nonprovisional of 62/946,990 filed 12 Dec. 2019
nonprovisional of 62/936,453 filed 16 Nov. 2019
nonprovisional of 62/933,526 filed 11 Nov. 2019
nonprovisional of 62/932,506 filed 8 Nov. 2019
nonprovisional of 62/927,157 filed 29 Oct. 2019
nonprovisional of 62/925,255 filed 24 Oct. 2019
nonprovisional of 62/914,485 filed 13 Oct. 2019
nonprovisional of 62/912,077 filed 8 Oct. 2019
nonprovisional of 62/911,236 filed 5 Oct. 2019
nonprovisional of 62/900,566 filed 15 Sep. 2019
nonprovisional of 62/894,976 filed 3 Sep. 2019
nonprovisional of 62/891,308 filed 24 Aug. 2019

TECHNICAL FIELD

This disclosure relates to RFID-enabled (or "contactless" capable) smartcards ("cards"), such as metal transaction cards and, more particularly, to metal cards using slit technology to facilitate contactless communication and taking measures to fill, seal and disguise the presence of the slit in the metal card body.

The disclosure may relate broadly to passive RFID-enabled metal transaction cards including "metal smartcards" such as encapsulated metal smartcards (aka encased metal cards), metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) capable of operating in a "contactless" mode (ISO 14443 or NFC/ISO 15693), including dual interface (DI) metal smartcards and metal payment objects (or "metal payment devices") which can also operate in "contact" mode (ISO 7816-2).

The disclosure(s) herein may further relate to biometric transaction cards and smartcards with a dynamic display.

The disclosure(s) herein may additionally relate to scratch resistant transaction cards having at least one layer of metal with a slit, and one synthetic layer which can be laser ablated to inscribe information and data.

Some of the disclosure(s) herein may relate to RFID-enabled metal transaction cards having only a contact interface, or having only a contactless interface, or having dual interface (DI; contact and contactless).

BACKGROUND

Generally, in the prior art, a coupling frame (CF) comprises a metal layer (ML) or metal card body (MCB) having a slit (S) extending from a peripheral edge of the metal layer or metal card body to an opening (MO) for receiving a transponder chip module (TCM) comprising an RFID chip (IC) and a module antenna (MA), for enabling a contactless interface. A dual-interface module may also have contact pads (CP) for enabling a contact interface. A transponder chip module (TCM) may be referred to as an "inductive coupling chip module".

A metal layer or multiple metal layers in a financial transaction card provides desirable weight and feel for use by high-end customers, with the metal acting as a reflective surface under a decorative pattern on a transparent layer which enhances the card's appearance and perceived value.

However, several technical problems arise in the manufacture of RFID enabled transaction cards having a metal face or a metal core construction, because of conflicting requirements in terms of RF performance and aesthetics. Compounding the problem is the requirement for laser personalization of the transaction card on or within an exposed surface or an underlying layer. A highly sophisticated appearance is a prerequisite in terms of visual aspects, vibrant colors, texture, smooth metal edges, deeply engraved logos and credentials, sufficient weight, and the "drop acoustics" of the card should sound like metal and not plastic. To achieve these prestige aspects in visual design, tactile effects and mechanical construction of the card, there remains the challenge to incorporate contactless functionality which meets the requirements of EMVCo, with or without a waiver.

For example, a hard coat layer laminated directly to a metal layer to provide scratch protection to the underlying surface is prone to develop cracks when the transaction card is flexed, making these cards undesirable for their intended use. Incorporating a slit in a metal layer of a transaction card may destabilize the mechanical robustness of the card rendering it not fit for purpose. Laser treatment of polymers can ideally be a photochemical process, but if the process is primarily photothermal, the resulting markings on or within the surface will visually be unacceptable.

Therefore, it is desirable to manufacture fashionable dual interface metal transaction cards which can provide "contactless" and/or "contact" capability. It is further desirable to make metal transaction cards which are scratch resistant, more durable and can be laser personalized.

Transaction cards embodying the invention include a metal core or metal face with a slit or slits which defines the contactless functionality of the card. Ink-baked metal surfaces protected by a hard coat layer or an ink or varnish coating can be laser personalized without negatively impacting the integrity of the hard coat layer through thermal degradation.

The prior art is vague (or silent) on measures to disguise or camouflage a discontinuity in a metal card body and how the discontinuity can become part of the artwork or graphic elements in the design of a metal transaction card.

However, US 20190236434 (2019 Aug. 1; Lowe; CompoSecure) discloses that the slit may not be visible. For example:
   The discontinuity as described herein may be optically visible from one or both surfaces of the card. In some embodiments, such as one in which the back surface is covered with an opaque plastic or translucent plastic with opaque ink, the discontinuity may not be visible from the back surface. In embodiments with front decorative layers, such as wood, leather, or certain ceramics, the discontinuity may also be hidden from the front.

US 20150021403 (22 Jan. 2015; Finn et al.) describes filling and disguising the slit at FIG. 5B [0236, 0246, 0259], and reinforcing the slit at FIG. 8 [0260-0264, 0267-0268].

Some Definitions

Some of the following terms may be used or referred to, herein. Some may relate to background or general knowledge, others may relate to the invention(s) disclosed herein.

RFID Slit Technology

Providing a metal layer in a stack-up of a card body, or an entire metal card body, to have a module opening for receiving a transponder chip module (TCM) and a slit (S) to enable contactless (RF) communication with the card—in other words, a "coupling frame"—may be described in greater detail in U.S. Pat. Nos. 9,475,086, 9,798,968, and in some other patents that may be mentioned herein. In some cases, a coupling frame may be formed from a metal layer or metal card body having a slit, without having a module opening. A typical slit may have a width of approximately 100 µm. As may be used herein, a "micro-slit" refers to a slit having a smaller width, such as approximately 50 µm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Digital Printing of Ultra-Violet Ink

UV printing is a form of digital printing that uses ultra-violet light to dry or cure ink as it is printed. As the printer distributes ink on the surface of a material (called a "substrate"), specially designed UV lamps follow close behind, curing—or drying—the ink instantly. A primer coat may be used to prime the substrate surface to enhance adhesion.

UV-flexible ink is a liquid which consists of monomers, colorant, additives, photoinitiator and stabilizer. UV hard ink comprises for example of the following elements: acryl acid ester, 1,6-hexanediol diacrylate initiator, additive and quinacridone series pigment. The primer is made up of aliphatic monomer, acrylic oligomer, aromatic monomer, additives and photoinitiator.

Moisture curing inks which cure over many days (typically 3 to 5 days) or hybrid mixtures of ink and an additive (catalyst) in a ratio of parts e.g. four to one, may not need a primer.

Digital Reverse UV Printing

Conventional lithographic printing on a six-color press defines the minimum thickness of a print film in the stack-up construction of a transaction card body. This minimum thickness of the print film is approximately 125 µm (5 mils). Reverse digital printing on overlay material (transparent or translucent) with a thickness of 50 µm (2 mils) significantly reduces the material thickness of the print layer, while at same time allowing for a thicker metal layer in a metal core or metal face transaction card, resulting in a heavier card.

Print Film and Overlay Material

Print films can be opaque or clear having various thicknesses depending on the position in the card body construction, as an overlay film on the rear of the card body to capture the magnetic stripe and the security elements, or form part of the core, with the films having different surface roughness, tension and VICAT temperature depending on the application. The base color of the print films can be different shades of white, colored, translucent or transparent. PVC films with an adhesive coating may be referred to as PVC WA. Transparent films may also be laser engravable.

Hard Coat Layer for Smartcards—Clear Diamond Coat Film

A hard coat layer (film) on a release-carrier layer is supplied to the smartcard industry by Crown Roll Leaf. The clear film can be hot stamped or laminated to a card body assembly, to provide a card surface finish with a high abrasion resistance and high chemical resistance. This film is designed for use on transaction cards, identification cards, transit passes and other similar cards where the film is applied on the card surface. Its high durability characteristics ensure the card information remains intact through the lifetime of the card. The release-carrier layer may comprise a matte polyester film having a thickness of 23 µm.

Screen Printing, Mist Coating, or Spraying a Lacquer

The alternative to applying a film to a card body assembly or subassembly is the screen printing, mist coating, spraying or curtain coating of an acrylic or lacquer to the surface requiring a protective layer. Such liquid medium can be transformed into a hard coat by the application of heat, typically in an oven.

Varnish and Ink

Varnish is a clear transparent hard protective finish or film. Varnish has little or no color and has no added pigment. Varnish finishes are usually glossy but may be designed to produce satin or semi-gloss sheens by the addition of "flatting" agents.

The term "varnish" refers to the finished appearance of the product. It is not a term for any single or specific chemical composition or formula. There are many different compositions that achieve a varnish effect when applied. A distinction between spirit-drying (and generally removable) "lacquers" and chemical-cure "varnishes" (generally thermosets containing "drying" oils) is common, but varnish is a broad term historically and the distinction is not strict.

Varnish is essentially ink without pigment and is available in many finishes including gloss, satin and dull. When applied in-line using a regular ink unit in the press, varnish can achieve exact dot-for-dot registration. Varnish manipulates how light reflects or is adsorbed into a sheet. Gloss varnish deepens colors while satin and dull finishes reduce contrast between colors.

In the smartcard industry, protective varnish has a viscosity η under 1000 Pascal-second (Pa·s) and is applied with a roller coater, while protective ink is applied by silk screen printing.

Laser Ablation or Photoablation

It is the process of removing material from a solid surface by irradiating it with a laser beam. At low laser fluence, the material is heated by the absorbed laser energy and evaporates or sublimates. At high laser fluence, the material is typically converted to a plasma. Usually, laser ablation refers to removing material with a pulsed laser, but it is possible to ablate material with a continuous wave laser beam if the laser intensity is high enough. In laser treating polymers and coated metal surfaces, one needs to distinguish between photochemical and photothermal ablation.

Laser Engraving

Laser engraving is an alternative technique to using tool bits which contact the engraving surface. It is a subset of laser marking, the practice of using lasers to engrave an object. The impact of laser marking has been more pronounced for specially designed "laserable" materials and also for some paints. These include laser-sensitive polymers such overlay material and novel metal alloys.

Finely polished metal sheets coated with enamel paint can be ablated using a laser. At levels of 10 to 30 watts, engravings are made as the enamel is removed or vaporized cleanly from the surface.

Anodized aluminum is commonly engraved or etched with a $CO_2$ laser machine. With power less than 40 Watts this metal can easily be engraved with clean, impressive detail. The laser bleaches the color exposing the white or silver aluminum substrate.

Spray coatings can be obtained for the specific use of laser engraving metals, these sprays apply a coating that is visible to the laser light which fuses the coating to the substrate where the laser beam passed over. Typically, these sprays can also be used to engrave other optically invisible or reflective substances such as glass and are available in a variety of colors.

Laserability of Cards which Includes a Metal Layer, as Presented in U.S. Pat. No. 10,395,153

This process shows good contrast and is very secure since the hard coat layer can be ablated down to the bare surface of the underlying metal. Note the hard coat layer is either ablated if it is in direct contact with the metal surface or unaffected (if adhesive and plastic layers are attached to the metal surface) depending upon how the print and background qualities of the card affect the laser beam reflection and absorption. Sometimes, with a powerful laser the surface of the metal may also be affected causing bright bare metal to remain.

SOME PATENTS AND PUBLICATIONS

The following patents and/or publications ("references") may be of interest or relevant to the invention(s) disclosed herein, and some commentary may be provided to distinguish the invention(s) disclosed herein from the following references.

U.S. Pat. No. 10,552,722 Smartcard with coupling frame antenna
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,812,782 Coupling frames for RFID devices
U.S. Pat. No. 9,798,968 Smartcard with coupling frame and method of increasing activation distance
U.S. Pat. No. 9,697,459 Passive smartcards, metal cards, payment objects
U.S. Pat. No. 9,634,391 RFID transponder chip modules
U.S. Pat. No. 9,622,359 RFID transponder chip modules
U.S. Pat. No. 9,489,613 RFID transponder chip modules with a band of the antenna extending inward
U.S. Pat. No. 9,475,086 Smartcard with coupling frame and method of increasing activation distance
U.S. Pat. No. 9,390,364 Transponder chip module with coupling frame on a common substrate
2020/0151534 Smartcards with metal layers and methods of manufacture
2020/0050914 Connection bridges for dual interface transponder chip modules
2020/0034578 Smartcard with display and energy harvesting
2020/0005114 Dual interface metal hybrid smartcard
2019/0392283 RFID transponder chip modules, elements thereof, and methods
2019/0197386 Contactless smartcards with multiple coupling frames
2019/0171923 Metallized smartcard constructions and methods
2019/0114526 Smartcard constructions and methods
2018/0341846 Contactless metal card construction
2018/0339503 Smartcards with metal layers and methods of manufacture

SOME ADDITIONAL (US) REFERENCES

U.S. Pat. No. 10,583,683 (10 Mar. 2020; Federal Card Services; Ridenour et al.)
U.S. Pat. No. 10,534,990 (14 Jan. 2020; CompoSecure; Herslow et al.)
U.S. Pat. No. 10,445,636 (15 Oct. 2019; Giesecke & Devrient; Virostek et al.)
U.S. Pat. No. 10,318,859 (11 Jun. 2019; CompoSecure; Lowe, et al.)
U.S. Pat. No. 10,289,944 (14 May 2019; CompoSecure; Herslow et al.)
U.S. Pat. No. 10,275,703 (30 Apr. 2019; CompoSecure; Herslow et al.)
U.S. Pat. No. 10,140,569 (27 Nov. 2018; Kim et al.)
U.S. Pat. No. 10,089,570 (2 Oct. 2018; CompoSecure; Herslow et al.)
U.S. Pat. No. 9,898,699 (20 Feb. 2018; CompoSecure; Herslow et al.)
U.S. Pat. No. 9,836,687 (2017 Dec. 5; Williams et al.; AMEX)
U.S. Pat. No. 9,760,816 (12 Sep. 2017; American Express; Williams et al.)
U.S. Pat. No. 9,721,200 (1 Aug. 2017; CompoSecure; Herslow et al.)
U.S. Pat. No. 9,564,678 (7 Feb. 2017; Murata Manufacturing; Kato et al.)
U.S. Pat. No. 9,390,366 (12 Jul. 2016; CompoSecure; Herslow et al.)
U.S. Pat. No. 9,299,020 (29 Mar. 2016; TheCard; Zimmerman et al.)
U.S. Pat. No. 9,203,157 (2015 Dec. 1; Kato et al.; Murata)
U.S. Pat. No. 9,024,763 (5 May 2015; Hamedani Soheil)

U.S. Pat. No. 8,976,075 (2015 Mar. 10; Kato et al.; Murata)
U.S. Pat. No. 8,737,915 (27 May 2014; J. H. Tonnjes E.A.S.T.; Beenken)
U.S. Pat. No. 8,608,082 (17 Dec. 2013; La Garrec et al.; Oberthur Technologies, aka IDEMIA)
U.S. Pat. No. 8,523,062 (2013 Sep. 3; Varga et al.)
U.S. Pat. No. 8,393,547 (12 Mar. 2013; Perfect Plastic Printing; Kiekhaefer et al.)
U.S. Pat. No. 8,186,582 (29 May 2012; American Express; Varga et al.)
U.S. Pat. No. 7,306,163 (11 Dec. 2007; IBM; Scholz et al.)
U.S. Pat. No. 6,491,229 (10 Dec. 2002; NJC Innovations; Berney)
U.S. Pat. No. 6,452,563 (17 Sep. 2002; Gemplus aka Gemalto; Porte)
2020/0164675 (2020 May 28; Ridenour et al.; FCS)
2019/0384261 (19 Dec. 2019; Kona I; Nam et al.)
2019/0311236 (2019 Oct. 10; Sexl et al.; G&D)
2019/0311235 (2019 Oct. 10; Sexl et al.; G&D)
2019/0291316 (2019 Sep. 26; Lowe; CompoSecure; now U.S. Pat. No. 10,583,594)
2019/0286961 (2019 Sep. 19; Lowe; CompoSecure)
2019/0236434 (1 Aug. 2019; CompoSecure; Lowe)
2019/0160717 (2019 May 30; Lowe; CompoSecure)
2019/0156994 (23 May 2019; X-Card Holdings; Cox)
2019/0073578 (7 Mar. 2019; CompoSecure; Lowe et al.)
2019/0050706 (14 Feb. 2019; Lowe; CompoSecure; now U.S. Pat. No. 10,406,734)
2015/0206047 (23 Jul. 2015; CompoSecure; Herslow)
2014/0231503 (21 Aug. 2014; Smart Co.; Kunitaka)
2013/0126622 (23 May 2013; Finn)
2012/0112971 (10 May 2012; Takeyama et al.; Panasonic)
2011/0181486 (28 Jul. 2011; Kato; Murata)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 2372840 (25 Sep. 2013; Hashimoto; Panasonic)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)
U.S. Pat. No. 7,287,704 (30 Oct. 2007, CompoSecure; Herslow),
U.S. Pat. No. 9,390,363 (12 Jul. 2016; CompoSecure; Herslow et al.)
U.S. Pat. No. 10,395,153 (27 Aug. 2019; CompoSecure; Herslow)
U.S. Pat. No. 10,373,920 (6 Aug. 2019; CompoSecure; Herslow)
U.S. Pat. No. 10,332,846 (25 Jun. 2019; CompoSecure; Herslow)
U.S. Pat. No. 10,311,346 (4 Jun. 2019; CompoSecure; Herslow)
U.S. Pat. No. 9,542,635 (10 Jan. 2017; CompoSecure; Herslow)
U.S. Pat. No. 7,278,580 (9 Oct. 2007; Digimarc; Jones et al.)
U.S. Pat. No. 7,207,494 (24 Apr. 2007; Digimarc; Theodossiou et al.)
U.S. Pat. No. 6,843,422 (18 Jan. 2005; Digimarc; Jones et al.)
US 2019/0332907 (31 Oct. 2019; CompoSecure; Herslow)
US 2018/0349751 (6 Dec. 2018; CompoSecure; Herslow et al.)

SUMMARY

The invention may relate to innovations in or improvements to RFID-enabled ("contactless capable) metal smartcards or metal transaction cards with/having Metal Inlay to Metal Card Body and various stack-up constructions.

It is an object of the invention(s), as may be disclosed in various embodiments presented herein, to provide improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stack-up of their card body, and including cards having a card body which is substantially entirely formed of metal (i.e., a metal card body).

It is an object of the invention to manufacture a durable, scratch resistant dual interface (DI) metal card or contact-only metal card which is not prone to develop cracks and does not require a special (separate) carrier layer in the production process, and to make such metal cards easy and economical to manufacture. Some prior art discloses a construction with three (3) layers: a carrier, a release layer and a hard coat. As disclosed herein, only two (2) layers are required: a release-carrier layer and a hard coat. The hard coat may be a UV absorption layer which you can personalize with a laser.

The metal layer in a metal card body may have a discontinuity in the form of a slit or slot to enable it to function as a coupling frame (CF), to facilitate contactless communication. Such a discontinuity is regarded (by some) as a defect in the card body design and it is desirable to disguise or hide its presence. It is an therefore an object of the invention to have a more aesthetically pleasing metal transaction card in which the slit or slot is not visible.

It is an object of the invention to manufacture metal transaction cards having a flat and solid front face color which cannot be scratched easily. Typically, UV curable inks are used on the cards, but are prone to being damaged (cracking) as a result of the card bending. They are typically applied using inkjet or other printing techniques. It is an therefore an object of the invention to improve the durability (scratch resistance) of the face color (for example) of a card, and this object may be achieved by using inks which are dried at elevated temperatures (screen printed, baked on), such as are used in the automobile industry. These inks may be referred to as baked-on inks. The painted surface of a vehicle is extremely strong and resistant to all weather conditions. Likewise, the baked-on ink surface of a card may be extremely durable.

According to the invention, generally, Apparatus and method for producing contact, contactless and dual-interface metal transaction cards that provides enhanced durability and aesthetics, with increased production efficiency. The cards may include (i) a metal core subassembly comprising a metal layer or layers (metal inlay) having a slit (S) allowing for contactless functionality, and (ii) a UV hard coat on a release-carrier layer disposed on one or both sides of the metal core subassembly, and (iii) everything may be laminated together in a single step, providing a metal face smartcard.

The UV hard coat provides for a durable, scratch-resistant surface, and may protect an underlying transparent laser-reactive layer and holographic laminate from wear and tear, and being scratched. The UV hard coat layer may allow the passage of a laser beam to scribe information and data on or within the transparent laser-reactive layer without negatively impacting the hard coat layer through photothermal degradation. The metal core or metal face may be coated with a primer, ink and a high gloss finish at an elevated temperature to camouflage the presence of the discontinuity.

Various techniques for hiding or camouflaging the slit are disclosed to provide a more aesthetically pleasing appearance to the metal transaction card. The slit may be rendered invisible by the use of selective patterning of artwork/graphics using digitally printed inks, primer and fillers. Other printing techniques such as screen and lithographic printing directly to metal may camouflage a slit in the metal card body. The slit may form part of graphic elements for the card. Printing and coating techniques may be used to camouflage the slit. Such camouflaging or hiding of the slit may A transaction card includes a metal core or metal face assembly having a discontinuity or a plurality of discontinuities and an opening to accept an inductive coupling chip module, and may include all the elements of a payment smartcard having a contact and contactless interface. The metal core or metal face may be formed solely of metal layers or of different combinations of plastic, ceramic, wood, adhesive and metal. A holographic laminate with a vacuum deposited nano-layer of metal may be assembled to the metal core or metal face to impart a decorative design which is electromagnetic transparent to radio frequency signals and additionally provides mechanical support to the underlying metal core or metal face assembly with a discontinuity and an opening for the inductive coupling chip module. A transparent laser-reactive layer in which credentials can be laser engraved therein may be mounted to the holographic laminate.

According to some embodiments (examples) of the invention, a smartcard may comprise a stackup of: a metal component which is a metal core or a metal face for the card, said metal component comprising one or more metal layers layer(s) having a slit enabling contactless functionality of the card, and wherein the metal component has a top side and a bottom side; and a protective layer which is UV hard coat (film) or a hard coating (screen-printed lacquer/ink/varnish) layer disposed over and protecting the metal component. The metal component may have a slit, and a baked-on coating of primer, ink and a finish may camouflage the slit. The protective layer may be a UV hard coat layer supported by a release-carrier layer which is removed after the layers are laminated together to form a completed assembly.

The protective layer may be laser-reactive. A laser treatment to the protective coating (coating of lacquer/varnish/ink) or the UV hard coat layer (film) on a release carrier layer can be ultraviolet, infrared or green, to impart information on or into the layer.

The stackup may further comprise a front transparent laser-reactive layer with printed information and graphics disposed on the top side of the metal component, between the protective layer and the metal component; and may further (optionally) comprise a rear plastic laser-reactive layer with printed information and graphics disposed on the bottom side of the metal component. In the manufacture of the card, when the stackup of layers for the card is laminated, the protective layer may impart a non-scratch gloss or matte finish to the front transparent laser-reactive layer.

The front transparent laser-reactive layer may have an adhesive backing and comprises a plastic layer of clear PVC, PC or PETG or any suitable synthetic material which is receptive to digital printing on its reverse side. The front transparent laser-reactive layer with a UV hard coat layer is adapted to be personalized by a laser beam, without damaging the hard coat layer during the laser etching process. The rear plastic laser-reactive layer may be transparent, translucent, white or colored PVC, PC, PETG or any suitable synthetic material which is receptive to ink, and includes a magnetic stripe.

In the various embodiments of stackups (constructions) for a smartcard (transaction card) disclosed herein, a transponder chip module (TCM) having a chip and an antenna configured to couple with the metal component so as to enable radio frequency communication with a contactless point of sale terminal may be incorporated into the card body (CB), such as in module openings (MO) in the various layers of the card body.

According to some embodiments (examples) of the invention, a smartcard may comprise: a core assembly of two metal layers separated by a dielectric layer; a layer of baked on ink disposed on a front side of the core assembly; and a UV hard coat laminated over the layer of baked on ink.

According to some embodiments (examples) of the invention, a method of manufacturing a smartcard may comprise: providing a metal core comprising at least one metal layer having a slit and an opening for a transponder chip module; disposing a front plastic layer on a front surface of the metal core; disposing a rear plastic layer on a rear surface of the metal core; disposing a hard coat layer which is carried by a release-carrier layer on one or both of the front and rear plastic layers; and laminating the metal core, front plastic layer, rear plastic layer and hard coat layer(s) on release-carrier layer(s) in a single laminating step. The laminating step may be performed at a predetermined temperature, pressure and dwell time such that the hard coat layer imparts a protective finish to the front or rear surface(s) of the card. The release-carrier layer may be removed after laminating. A number of clear PVC layers may be provided in the stackup of layers for the card construction; and portions of the clear PVC layers may be selectively exposed to a laser beam for the engraving of card credentials. UV lasers may be used. IR lasers may also be used. A magnetic strip and security elements may be disposed on a back surface of the card. Graphics may be provided on the front or back surface of the card to camouflage the presence of a slit in the metal layer or layers. A transponder chip module having at least contactless capability may be disposed in the card.

According to some embodiments (examples) of the invention, a method of manufacturing a smartcard having a metal face or a metal core may comprise: performing CNC machining in a freezing environment achieved by the application liquid carbon dioxide or nitrogen. The CNC machining may be performed during singulation of the card from an inlay comprising many cards.

According to some embodiments (examples) of the invention, a laser-personalized metal transaction card may comprise: a metal core or metal face having a discontinuity; a holographic laminate with a metal sheen or a vacuum deposited metal layer which is electromagnetic transparent to radio frequency signals at an ISM frequency of interest, e.g. 13.56 MHz; and a transparent laser-reactive layer mounted to the holographic layer adapted to be personalized by a laser beam wherein said holographic laminate mechanically supports the metal core or metal face with a discontinuity in the form of a slit.

According to some embodiments (examples) of the invention, a metal face transaction card may comprise: a metal layer assembly on which information has been screen printed using a primer and inks protected by an overcoat layer and baked at an elevated temperature of 400° F.; an adhesive layer for bonding a synthetic layer to the metal layer; a synthetic layer having a color scheme which matches the color and texture of the front face metal layer;

and a transparent laser-reactive layer with magnetic stripe on or within which information can be written using a laser beam. A UV hard coat layer may be disposed on the screen printed metal layer. An inductive coupling chip module (or TCM) may be embedded in the card. A front face metal layer of the card may be personalized with a laser.

According to some embodiments (examples) of the invention, a smartcard (SC) may comprise: a first, front face metal layer (ML, 902) with a module opening (MO) and slit (S); a primer layer (904) disposed on a front surface of the front face metal layer; a first ink layer (908) disposed on the primer layer; a protective varnish or ink layer (912) disposed on the first ink layer; a second ink layer (910) disposed over the varnish or ink layer; a second, supporting metal layer (ML, 922) with a module opening (MO) and slit (S) disposed below the first metal layer; a dielectric layer (920) with adhesive on both sides (double-sided) disposed between a rear surface of the first metal layer and a front surface of the second metal layer; an adhesive layer (924) disposed below the second metal layer; a synthetic layer with artwork (926) disposed below the adhesive layer; and a laser-engravable overlay (928) with a magnetic stripe and a signature panel disposed below the synthetic layer. The positions of the primer layer (904) and the first ink layer (908) may be interchanged with one another. A clear layer of flexible ink may be disposed over at least one of the first ink layer (908), the protective varnish or ink layer (912) and the second ink layer (910). A concealing ink layer (906) may be disposed between the primer layer and the first ink layer. The positions of the first ink layer (908) and the concealing ink layer (906) may be interchanged with one another. A second ink layer (910) may be disposed on the first ink layer; and the protective varnish or ink layer (912) may be disposed on the second ink layer. The positions of the second ink layer (910) and the protective varnish or ink layer (912) may be interchanged with one another. A personalization/laser engraving operation may be applied to or disposed on the protective varnish or ink layer. A coating or sealant may fill a slit in the metal layer(s).

According to some embodiments (examples) of the invention, a smartcard (SC) may comprise: a metal layer (ML, 902) with a module opening (MO) and a slit (S); a primer layer (903) over the metal layer; a coating or sealant (907) over the primer layer; an ink layer (908) over the coating or sealant; and a laser engravable top coat layer (909) over the ink layer. The primer, coating or sealant, ink, and top coat layers may all be baked onto the metal layer. Each of the primer layer, coating or sealant, baked-on ink layer, and top coat layer also have a module opening extending therethrough, for accepting a transponder chip module.

Generally, some individual features mentioned with respect a given embodiment may be incorporated into some of the other embodiments.

Metal transaction cards embodying the invention may generally include:
  a metal core subassembly, having one or two metal layers, whose elements define the functionality of the card, and
  a hard coat (or coating) disposed on a combined release+carrier ("release-carrier) layer which may be attached to (disposed on) the top and/or bottom sides (surfaces) of the metal core subassembly.

The release-carrier layer may comprise a matte polyester film having a thickness of 23 µm. This may be contrasted with the prior art (e.g., U.S. Pat. No. 10,395,153) which requires separate release and carrier layers.

The metal core subassembly may be formed solely of a single metal layer, several metal layers separated by a dielectric, of different combinations of plastic, adhesive and metal layers or essentially purely metal layers.

The card body assembly may also include:
(a) a metal layer or metal layers made of a non-magnetic metal such as stainless steel or titanium having a slit (S) to act as a coupling frame (CF), facilitating contactless communication;
(b) a semiconductor chip containing selected electronic circuits mounted to a module tape (MT) having a module antenna (MA) for inductive coupling with the metal when in an electromagnetic field generated by a contactless terminal.

According to an embodiment of the invention, the metal card body may comprise a metal front (front metal layer) with a synthetic backing to capture the magnetic stripe and the security elements, and may be referred to as a metal face smartcard. In an embodiment of the invention, the front metal layer may have a slit filled with a dielectric to reinforce the card construction, and such filled slit may be disguised behind artwork/graphics using digitally printed flexible ink and hard ink. The slit may be filled by means of a digital inkjet process to further camouflage its presence. The slit may also be camouflaged by other techniques such as screen or lithographic printing or by application of a coating.

According to an embodiment of the invention, printing techniques may be used (implemented) which produce the illusion of a debossed or embossed logo on a metal surface using clear or colored UV inks. Such logos may be further treated with a laser to create characters for aesthetic purposes.

According to an embodiment of the invention, CNC machining of metal core, metal face or solid metal smartcards requires a cooling system superior to traditional fluid or mist cooling methods such as the use of ethanol, oil or flood cooling by submerging the workpiece in a coolant. Cryogenic milling may utilize freeze (frozen) carbon dioxide or liquid nitrogen.

According to an embodiment of the invention, the thickness of the metal layer or layers in a metal core or metal face smart card may be increased by reducing the overall thickness of the synthetic layers in the card stack-up construction, which may be achieved by printing on thinner layers of plastic or directly on the adhesive layer(s). Reverse digital printing on overlay material (transparent or translucent) with a thickness of 50 µm (2 mils) is a step in achieving this objective. Printing directly on an adhesive layer of less than 25 µm (1 mil) may resolve this issue.

CNC milling of transaction cards having layers of different materials such as plastic, adhesive and metal are prone to develop rough surface edges during singulation, if the milling speed, milling tools, vacuum chuck or cooling system are not process aligned.

It is an object of the invention to resolve (minimize) these defects, which may result in significant scrap (waste) in the manufacture of metal transaction cards.

This object may be achieved by cooling of the area being machined, to avoid charring and roughening of the surface being milled or chamfered, and to extend the life of the milling tools.

It is an object of the invention to provide improved durability and enhanced appearance to metal transaction cards, such as debit and credit cards.

According to an embodiment of the invention, an RFID enabled metal transaction card may comprise:

a sandwich-like structure comprising a core metal layer with a slit which defines (enables, enhances) the contactless functionality of the card;

a laser-reactive layer (transparent overlay with an adhesive coating) on which or within which information or artwork can be scribed (created) using a laser; and a transparent or translucent layer on which information is printed using inks, interposed between the core metal layer and the laser-reactive layer and bonded to each of these layers.

The core metal layer may be formed of edge-to-edge non-magnetic high tensile strength stainless steel or any other suitable metal which provides weight and rigidity to the card construction.

The laser-reactive layer (transparent overlay with an adhesive coating) may be polycarbonate (PC) or it may be any other suitable synthetic material (e.g., PVC, PETG, etc.) which includes chemical bonds which can react with a laser beam to produce desirable markings.

The transparent or translucent layer may be formed of a synthetic material which is receptive to inks (e.g. PVC) or any other suitable material which can readily bond to the core layer and the laser-reactive layer.

The laser-reactive layer may have a protective UV hard coat layer on a release-carrier layer laminated to its front surface. The laser-reactive layer may have a protective UV coating printing (e.g. screen printing) on its front surface. Both the UV hard coat layer and the UV coating can be laser personalized.

A laser may write into the UV hard coat layer (by ablating), without going through it, by ablating (de-layering) material rather than burning it, without discoloring it. This is a photochemical process, rather than a photothermal process. A laser beam can pass through the UV hard coat layer to write (information, data) onto an underlying metal layer for personalizing the card. Generally, this all depends on the wavelength and fluence of the laser and the properties of the materials upon which the laser is directed. It is desirable that there not be any layers over the metal layer(s) that react negatively (i.e., by burning) to the laser.

A transparent layer (clear PVC) may be attached or bonded to the metal core using an adhesive layer or with the addition of a transparent PVC layer with an adhesive backing (PVC WA, 419).

The resulting structure of the multi-layered transaction card may be symmetrical with a like number of layers of similar dimensions being formed and bonded both above the core metal layer and below the core metal layer.

According to an embodiment of the invention, a holographic laminate with a metal sheen or with a vacuum deposited nano-layer of metal can be assembled to an RFID enabled metal transaction card without impairing the contactless interface. The holographic laminate may be (i) electromagnetically transparent to RF signals generated by a contactless terminal; (ii) used to camouflage a slit in an underlying metal layer; and/or (iii) laminated to an overlay layer which is laser engravable.

A UV hard coat layer may be applied on a release-carrier layer assembled to a metal layer with a high gloss finish (coating) produced from polyurethane, a blend of polyester and polyurethane, acrylic or epoxy.

A transparent laser-reactive layer, a holographic laminate (full face metallized laminate), an adhesive layer and a metal core may be laminate together during the manufacture of the transaction card. Like number of layers of similar dimensions may be formed and bonded below the core metal layer as above the core metal layer.

According to an embodiment of the invention, a metal transaction card embodying the invention may include a sandwich-like structure comprising:

a core metal layer on which information is screen or lithographically printed using inks protected by an enamel or lacquer, a transparent laser-reactive layer on or within which information can be written using a laser beam, and a transparent or translucent layer interposed between the metal core layer and the laser-reactive layer and bonded to each of these layers.

The metal core layer may be formed of non-magnetic high tensile strength stainless steel or aluminum or any other suitable metal on which information or a design can be printed and baked on at an elevated temperature of 400° F.

The transparent or translucent layer may be formed of PETG or any other suitable material which can readily bond to the core metal layer and the transparent laser-reactive layer.

The transparent laser-reactive layer may be polycarbonate (PC) or it may be any other suitable plastic material (e.g., PVC, PETG, etc.) which includes a chemical which can react with a laser to produce desirable markings.

A protective layer may be sprayed on or a lacquer may be applied by any suitable coating technique, post lamination and laser personalization. The coating (polyurethane, a blend of polyester and polyurethane, acrylic or epoxy) may be laser engravable. An ink coating may be screen printed and may also be laser engravable.

According to an embodiment of the invention, a logo of a payment scheme and/or an issuing bank may be mechanically engraved into an ink-baked metal layer having a flat color, and in a subsequent production process, a UV hard coat layer (aka a "diamond coat") on a release layer is laminated to the mechanically engraved metal layer to protect its surface. The hard coat layer is characterized by significant UV absorption. The clear or colored UV hard coat layer may be replaced by a coating of ink or varnish and sprayed on, mist-coated, or screen printed to the metal surface.

It is an object of the invention to produce metal core or metal face transaction cards having a discontinuity to function as a coupling frame, and using graphic elements incorporating the discontinuity to produce aesthetically pleasing smartcards that are mechanically robust and are not weaken in rigidity by the presence of the discontinuity in a metal layer forming part of the metal card body.

The following may relate specifically to the embodiment shown in FIG. 9B (reference numerals included for clarity and convenience). According to an embodiment of the invention, a smartcard (SC) may comprise:

a first, front face metal layer (ML, 902) with a module opening (MO) and slit (S);

a primer layer (904) disposed on a front surface of the front face metal layer;

a first ink layer (908) disposed on the primer layer;

a protective varnish layer (912);

a dielectric layer (920) with adhesive on both sides (double-sided) disposed between the rear surface of the first metal layer and the front surface of a second, supporting metal layer (ML, 922);

a second, supporting metal layer (ML, 922) with a module opening (MO) and slit (S) disposed below the dielectric layer;

an adhesive layer (924) disposed below the second metal layer;

a synthetic layer with artwork (926) disposed below the adhesive layer; and a laser-engravable overlay with a magnetic stripe and a signature panel disposed below the synthetic layer.

The smartcard may further comprise a personalization/laser engraving operation (914) applied to or disposed on the protective varnish or ink layer, and a coating or sealant filling the slit.

Before or after the primer layer is applied, a coating may be introduced to fill the slit. A concealing ink layer (906) may be disposed between the primer layer and the first ink layer. The first ink layer and concealing ink layer may be interchanged with one another, so that the first ink layer is disposed on the primer layer and the concealing ink layer is disposed on the first ink layer.

A second ink layer (910) may be disposed on the first ink layer, and the protective varnish or ink layer may be disposed on the second ink layer. The second ink layer and the protective varnish or ink layer may be interchanged with one another, so that the protective varnish layer is disposed on the first ink layer and the second ink layer is disposed on the protective varnish or ink layer.

In the various embodiments of stackup constructions disclosed herein, a clear ink layer may be applied between printed ink layers and other layers.

According to an embodiment of the invention, a smartcard (SC) may comprise:
- a first, front face metal layer (ML, 902) with a module opening (MO) and slit (S);
- a primer layer (904) disposed on a front surface of the front face metal layer;
- a first ink layer (908) disposed on the primer layer;
- a protective varnish or ink layer (912) disposed on the first ink layer;
- a second ink layer (910) with raised alphanumeric characters (910) disposed on the varnish or ink layer;
- a personalization/laser engraving operation (914) applied to or disposed on a protective varnish or ink layer;
- a dielectric layer (920) with adhesive on both sides (double-sided) disposed between the rear surface of the first metal layer and the front surface of a second, supporting metal layer (ML, 922);
- a second, supporting metal layer (ML, 922) with a module opening (MO) and a slit (S) disposed below the dielectric layer;
- an adhesive layer (924) disposed below the second metal layer;
- a synthetic layer with artwork (926) disposed below the adhesive layer;
- a laser-engravable overlay (928) with a magnetic stripe and a signature panel disposed below the synthetic layer.

Before or after the primer layer is applied, a coating or sealant may be introduced to fill the slit. A hologram may be hot-stamped to the protective varnish or ink layer.

The following may relate specifically to the embodiment shown in FIG. 9C (reference numerals included for clarity and convenience). According to an embodiment of the invention, a smartcard (SC) may comprise:
- a first, front face metal layer (ML, 902) with a module opening (MO) and a slit (S);
- a primer layer (904) disposed on a front surface of the front face metal layer;
- a first ink layer (908) disposed on the primer layer;
- a second ink layer with raised alphanumeric characters (910) disposed on the first ink layer;
- a protective varnish or ink layer (912) disposed on the second ink layer;
- a personalization/laser engraving operation (914) applied to disposed on the protective varnish or ink layer;
- a dielectric layer (920) with adhesive on both sides (double-sided) disposed between the rear surface of the first metal layer and the front surface of a second, supporting metal layer (ML, 922);
- a second, supporting metal layer (ML, 922) with a module opening (MO) and a slit (S) disposed below the dielectric layer;
- an adhesive layer (924) disposed below the second metal layer;
- a synthetic layer with artwork (926) disposed below the adhesive layer;
- a laser-engravable overlay (928) with a magnetic stripe and a signature panel disposed below the synthetic layer.

Before or after the primer layer is applied, a coating or sealant may be introduced to fill the slit. A hologram may be hot-stamped to the protective varnish or ink layer.

The following may relate specifically to the embodiment shown in FIG. 9D (reference numerals included for clarity and convenience). According to an embodiment of the invention, a smartcard (SC) may comprise:
- a first, front face metal layer (ML, 902) with a module opening (MO) and a slit (S);
- a primer layer (904) disposed on a front surface of the front face metal layer;
- a concealing ink layer (906) and a first ink layer (908) disposed on the primer layer;
- a second ink layer (910) with raised alphanumeric characters disposed on the concealing ink layer or the first ink layer;
- a protective varnish or ink layer (912) disposed on the second ink layer;
- a personalization/laser engraving operation (914) applied to or disposed on the protective varnish or ink layer;
- a dielectric layer (920) with adhesive on both sides (double-sided) on a carrier (PET or PEN) disposed between the rear surface of the first metal layer and the front surface of a second, supporting metal layer (ML, 922);
- a second, supporting metal layer (ML, 922) with a module opening (MO) and a slit (S) disposed below the dielectric layer;
- an adhesive layer (924) disposed below the second metal layer;
- a synthetic layer with artwork (926) disposed below the adhesive layer; and
- a laser-engravable overlay (928) with a magnetic stripe and a signature panel disposed below the synthetic layer.

Before or after the primer layer is applied, a coating or sealant may be introduced to fill the slit. A hologram may be hot-stamped to the protective varnish or ink layer.

The protective ink layer may be a UV curable screen-printing which is laser engravable and formulated for use on ink printed or synthetic coated metal substrates.

The following may relate specifically to the embodiment shown in FIG. 9A (reference numerals included for clarity and convenience). According to an embodiment of the invention, a smartcard (SC) may comprise:
- a metal layer (ML, 902) with a module opening (MO) and a slit (S);
- a primer layer (903) disposed over the metal layer;

a coating or sealant (907) disposed over the primer layer; and an ink layer (908) over the coating or sealant; and a laser engravable top coat layer (909) over the ink layer.

The primer, coating or sealant, ink, and top coat layers may all be baked onto the metal layer. Each of the primer layer, coating or sealant, baked-on ink layer, and top coat layer may also have a module opening extending therethrough.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

The following figures may be referred to and/or described in the text.

Figure 1A:
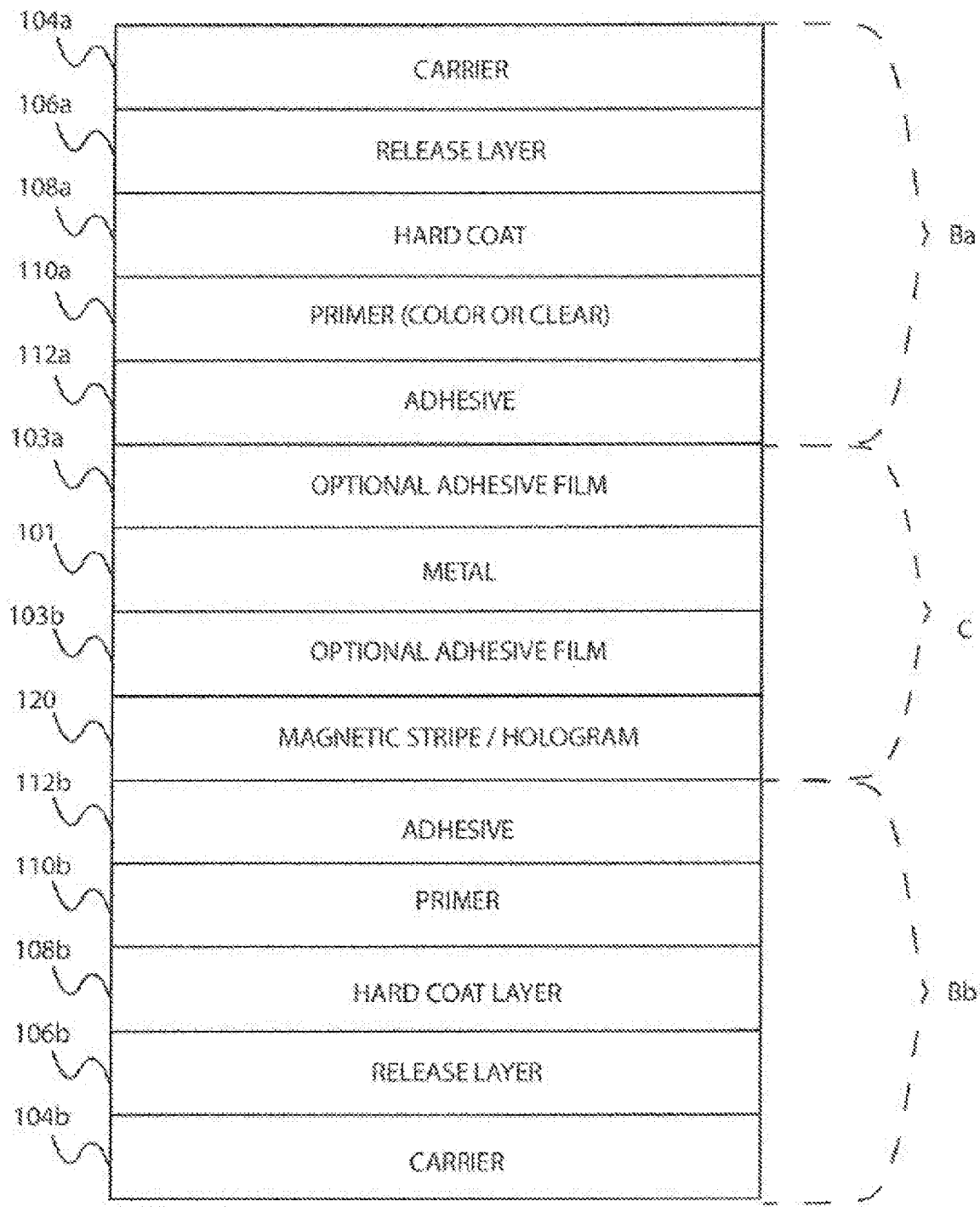

FIG. 1A (compare FIG. 4A of U.S. Pat. No. 10,395,153) is a highly simplified cross-sectional diagram of a metal card assembly for manufacturing a durable metal card formed with a hard coat layer on the top and bottom sides of the card, according to the prior art.

Figure 1B:
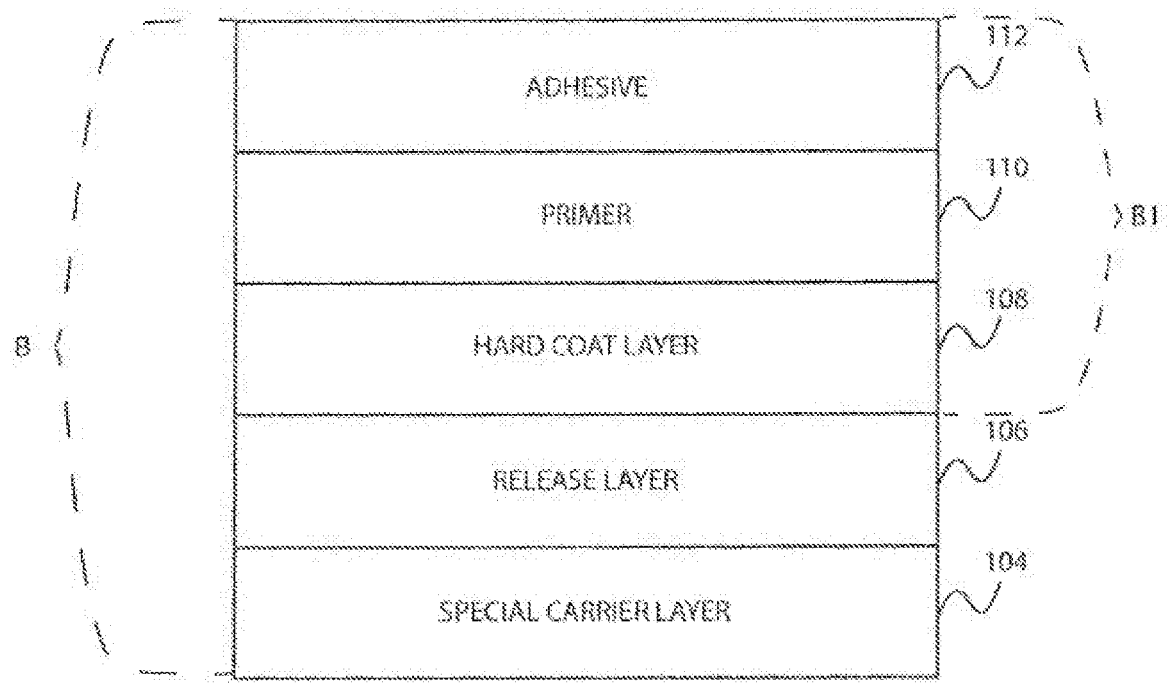

FIG. 1B (compare FIG. 1B of U.S. Pat. No. 10,395,153) is a highly simplified cross-sectional diagram of a hard coat layer sub assembly (subassembly B) intended to be combined with assorted core subassemblies to form durable cards, according to the prior art.

Figure 1C:
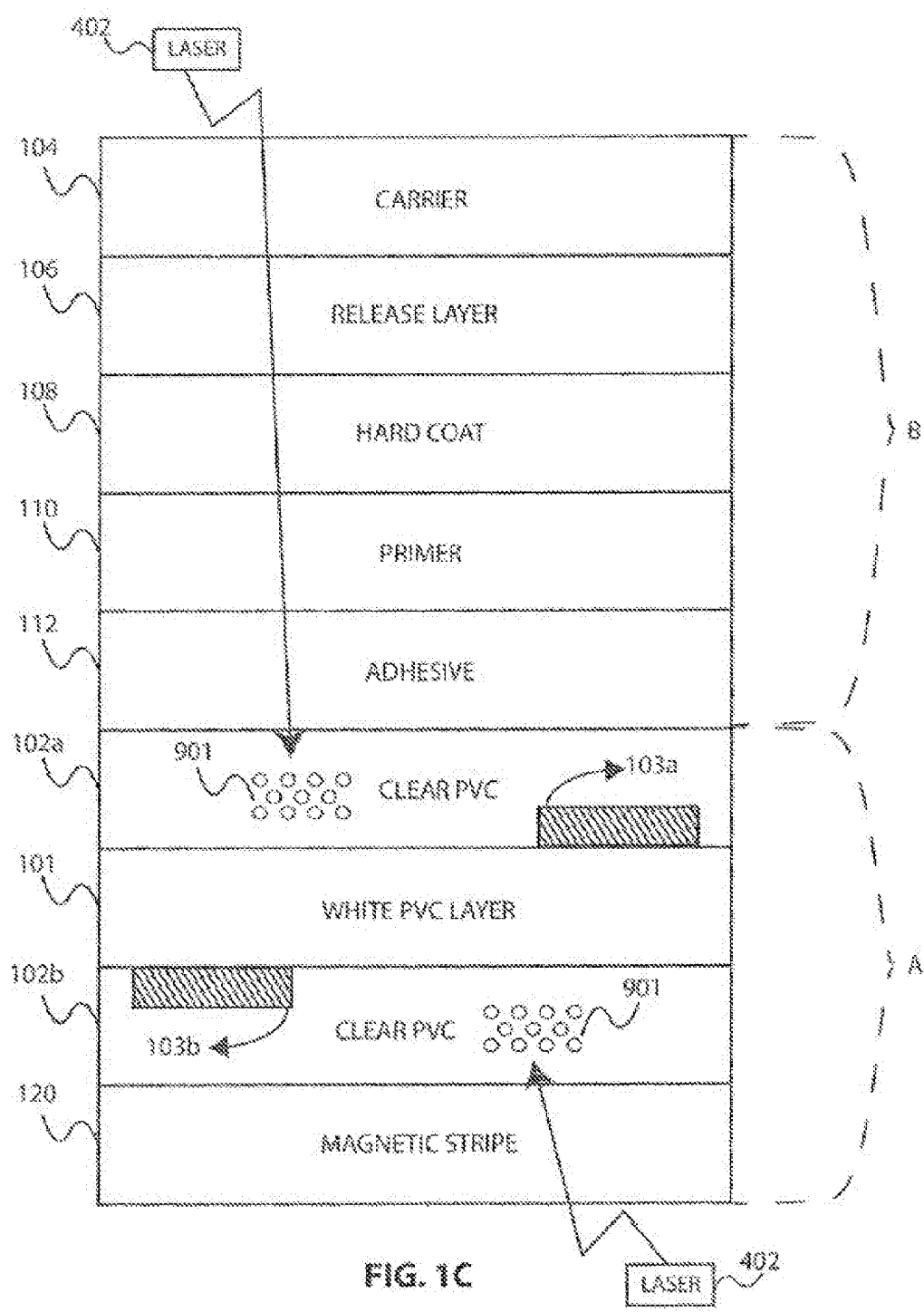

FIG. 1C (compare FIG. 1C of U.S. Pat. No. 10,395,153) is a highly simplified cross-sectional diagram of a core plastic card sub assembly (subassembly A) combined with a hard coat layer sub assembly (subassembly B), according to the prior art.

Figure 1D:
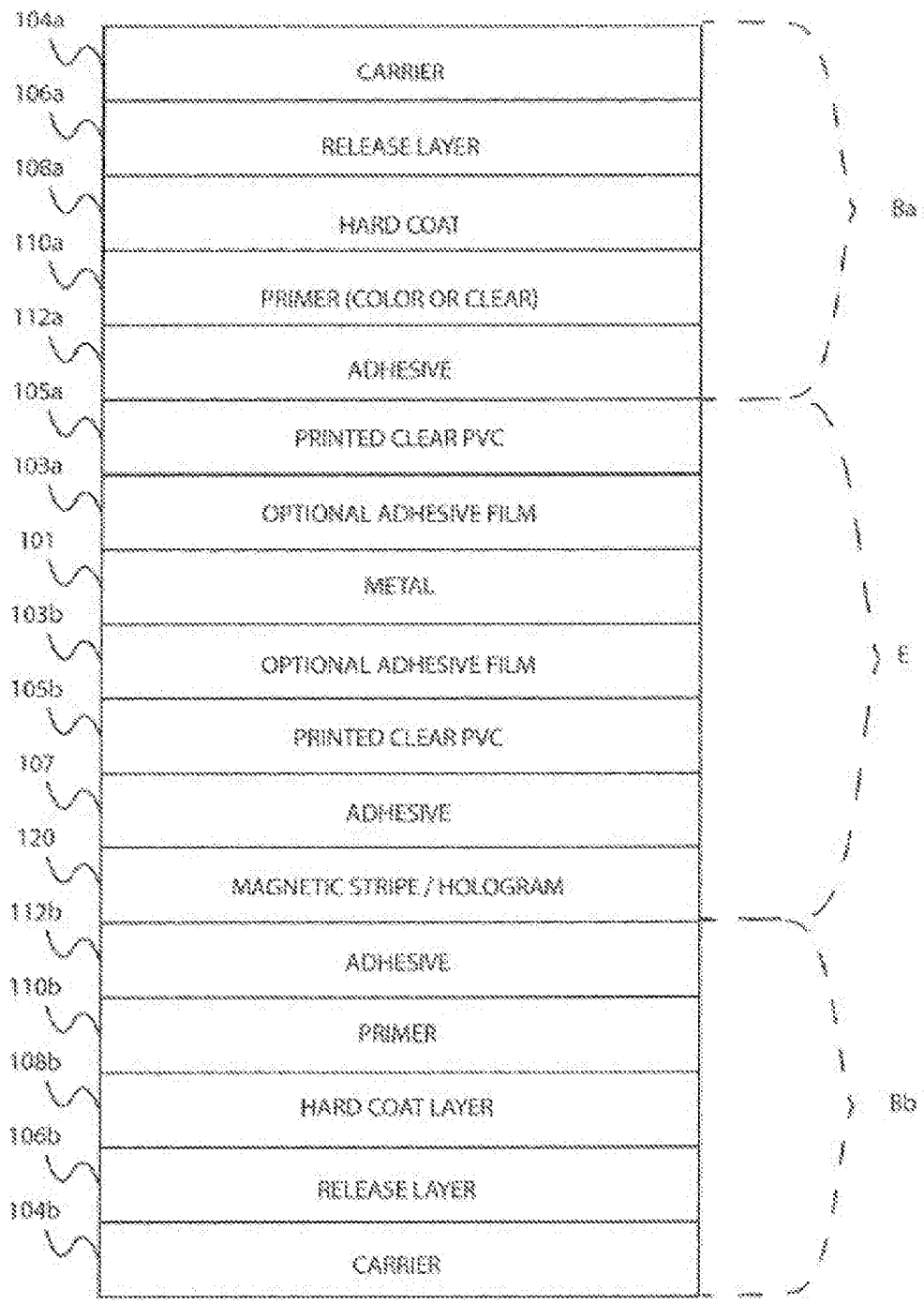

FIG. 1D (compare FIG. 6A of U.S. Pat. No. 10,395,153) is a highly simplified cross-sectional diagram of an "embedded" metal card assembly for manufacturing a durable metal card, according to the prior art.

Figure 1E:
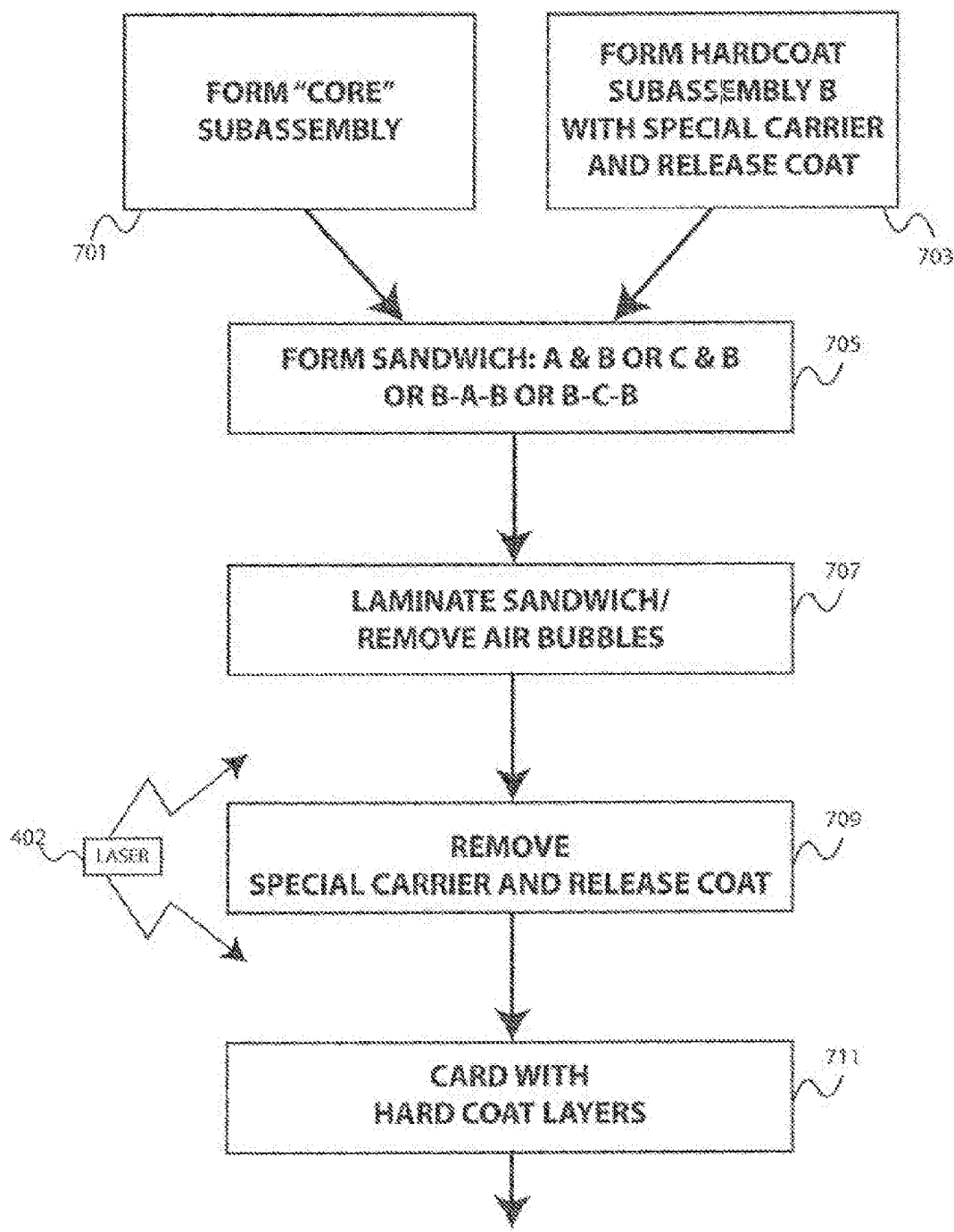
Figure 7:
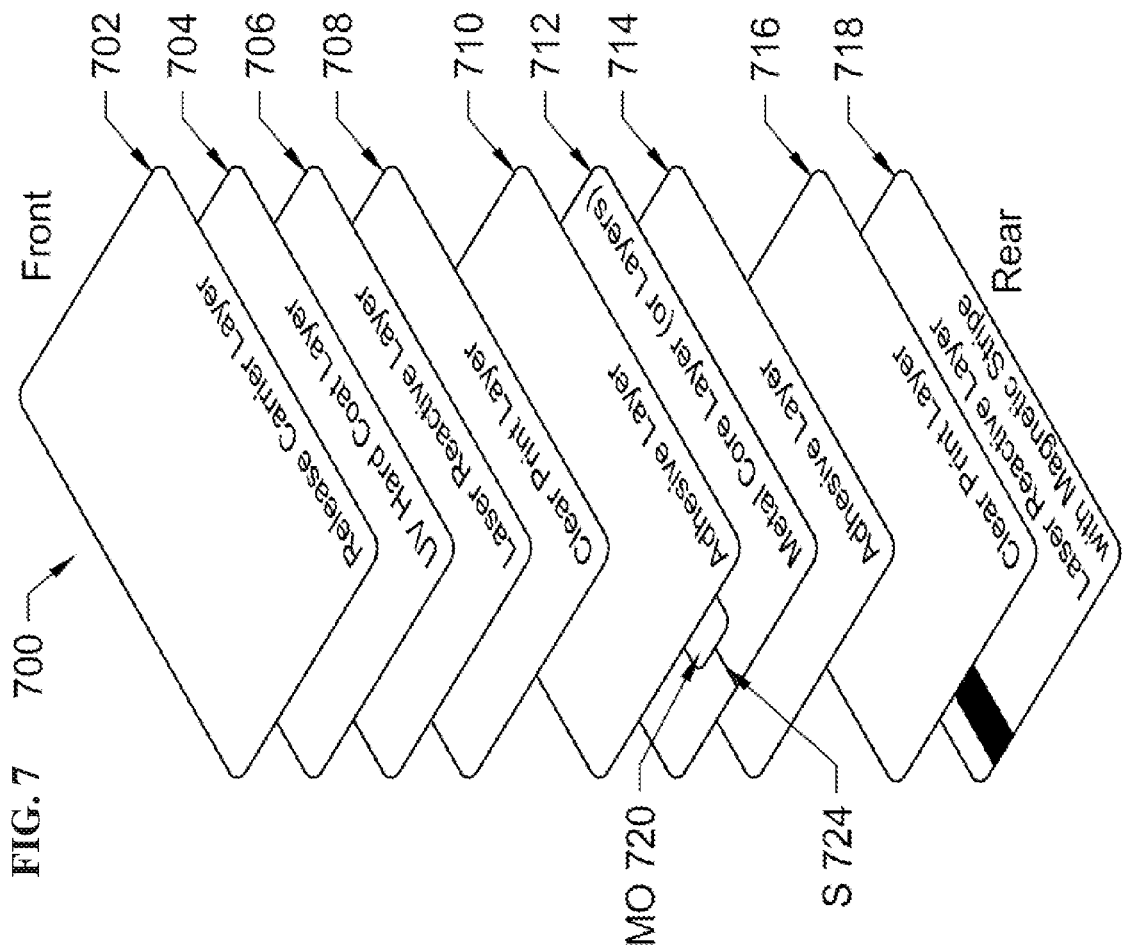

FIG. 1E (compare FIG. 7 of U.S. Pat. No. 10,395,153) is a flow chart diagram showing various processing steps in forming cards, according to the prior art.

Figure 2:
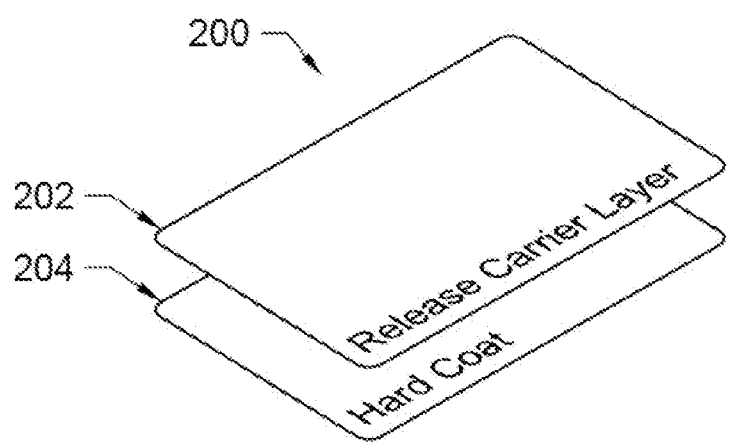

FIG. 2 (compare FIG. 2 of U.S. 62/912,077) is a cross-sectional diagram of a hard coat layer on a release-carrier layer intended to be laminated to a metal layer or layers or to a clear PVC layer (overlay) protecting printed information on a PVC layer or PETG layer, to form a scratch resistant metal transaction card, according to the invention.

Figure 3:
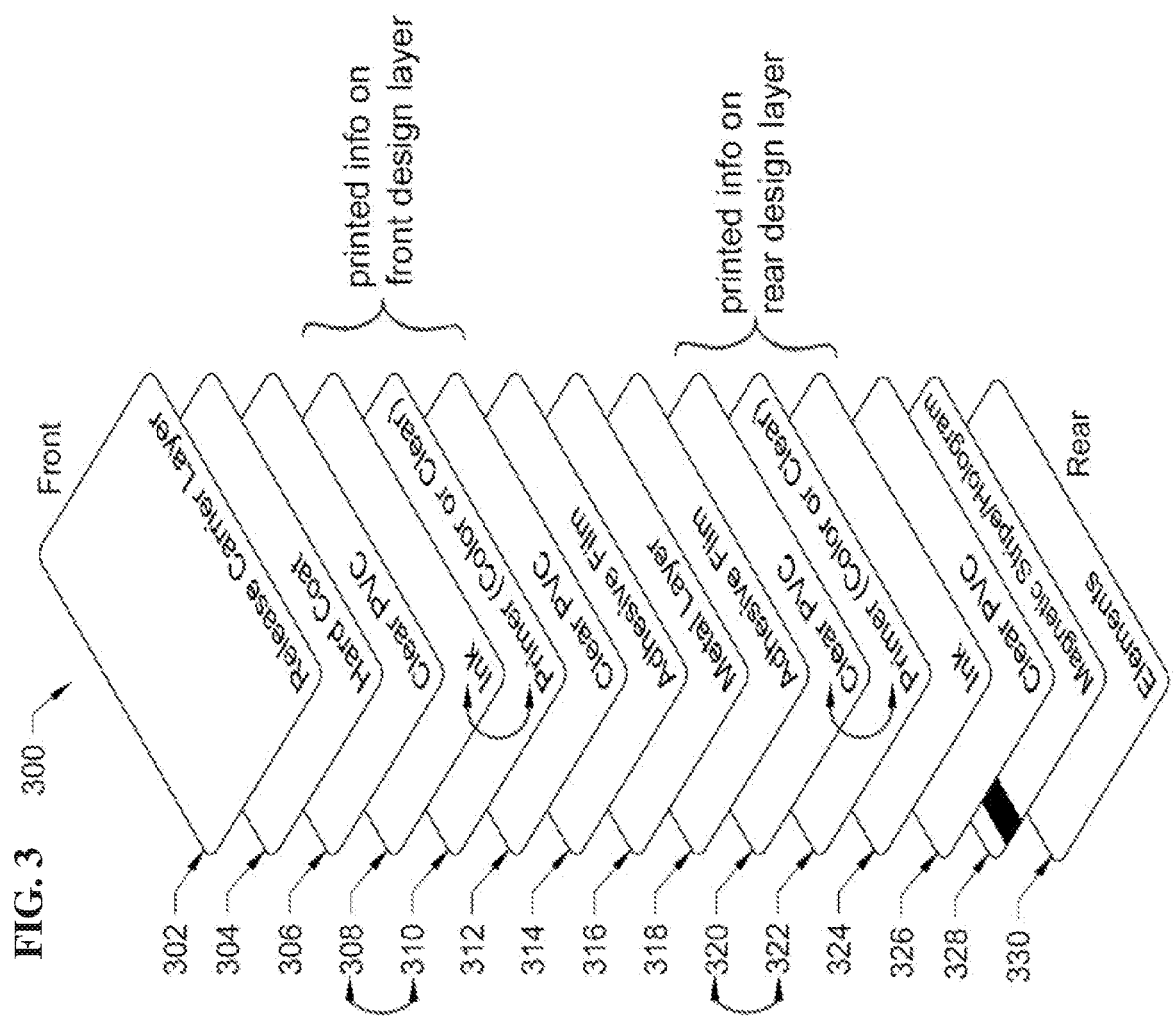

FIG. 3 (compare FIG. 3 of U.S. 62/912,077) is a simplified cross-sectional diagram of an "embedded" metal card assembly for manufacturing a durable metal card, according to the invention.

Figure 4:
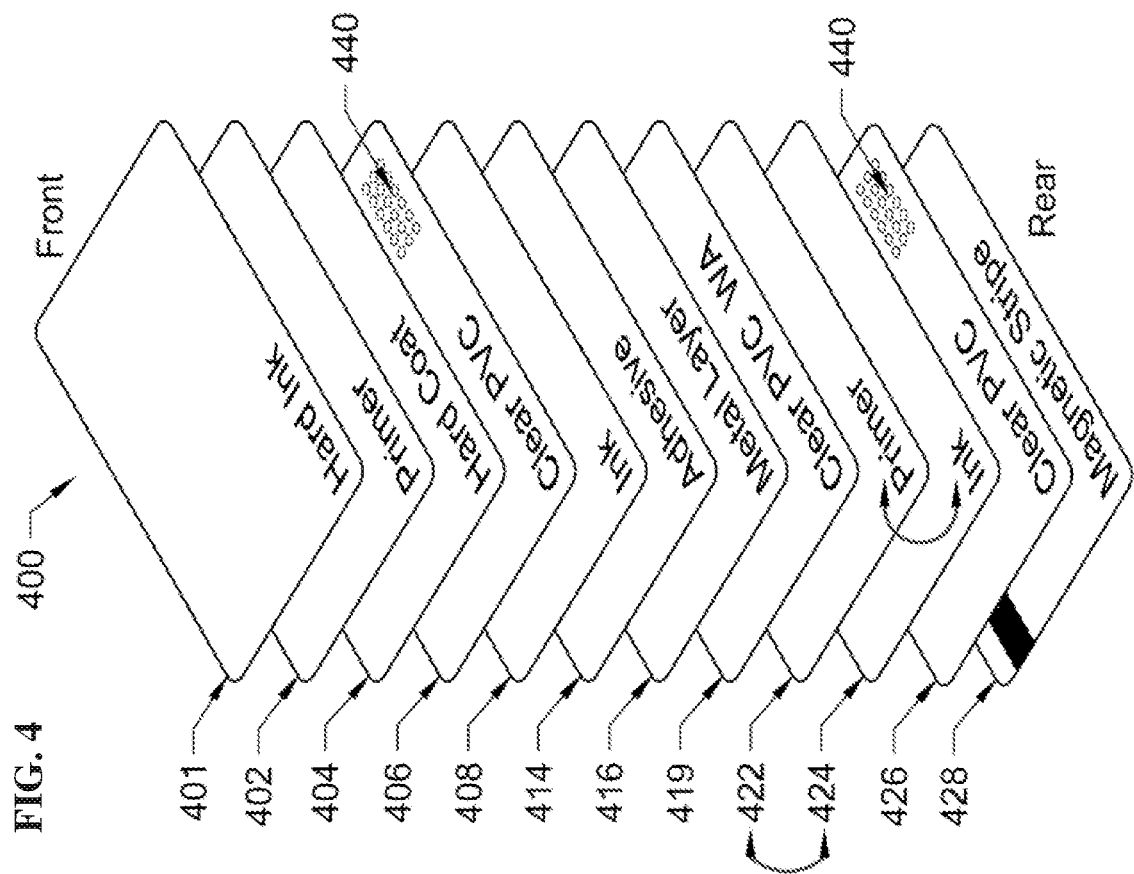

FIG. 4 (compare FIG. 4 of U.S. 62/912,077) is a simplified cross-sectional diagram of a "hybrid" metal card assembly or metal face card assembly for manufacturing a durable metal transaction, according to the invention.

Figure 5:
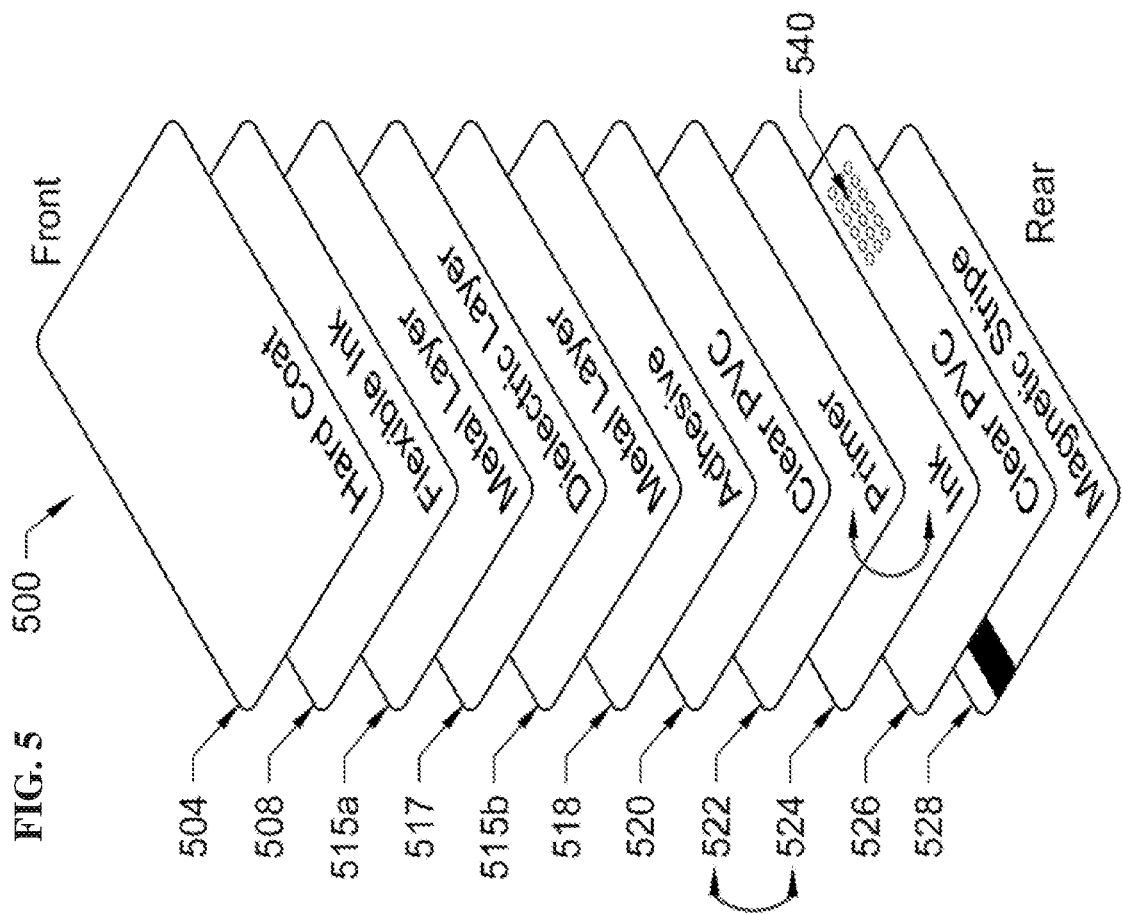

FIG. 5 (compare FIG. 5 of U.S. 62/912,077) is a simplified cross-sectional diagram of a "hybrid" metal card assembly or metal face card assembly for manufacturing a durable metal transaction card having a flat solid front color surface, according to the invention.

Figure 6:
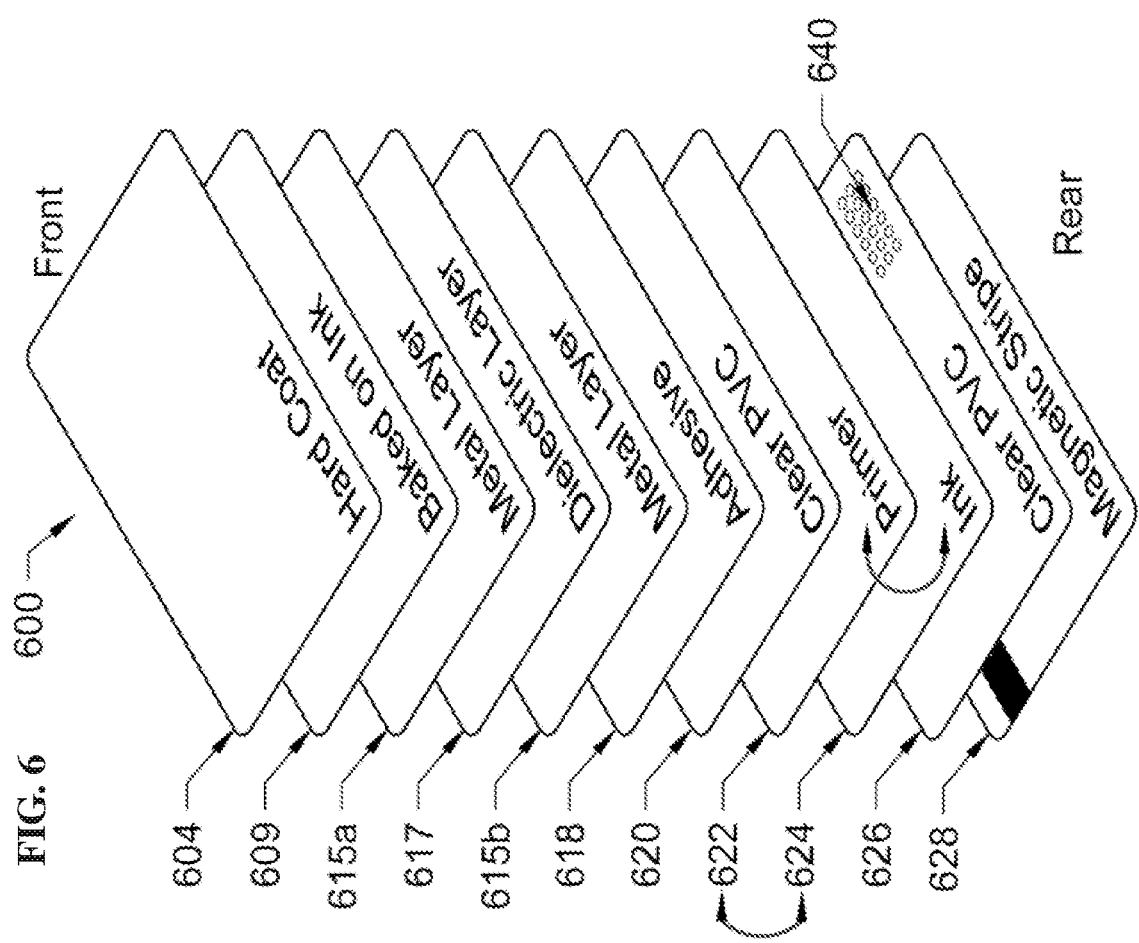

FIG. 6 (compare FIG. 6 of U.S. 62/912,077) is a modification of FIG. 5 illustrating a cross-sectional diagram of a "Metal Face" card assembly with a front-face ink-baked metal surface protected by a hard coat layer for manufacturing a durable metal transaction card, according to the invention.

FIG. 7 (compare FIG. 4 of 62/979,440) is a cross-sectional diagram (not to scale) of a stack-up of layers for a metal transaction card, according to an embodiment of the invention.

Figure 8:
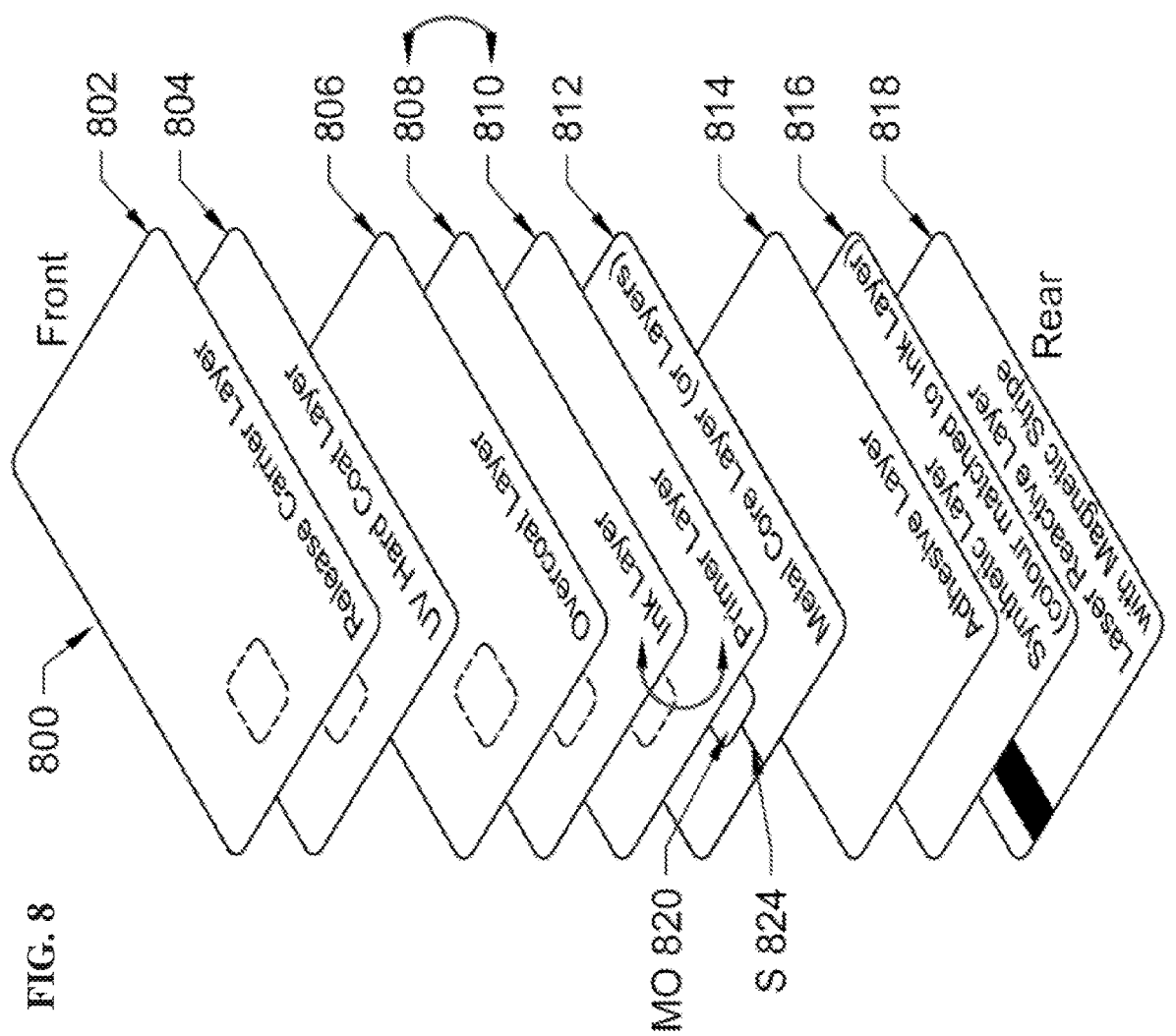

FIG. 8 (compare FIG. 5 of 62/979,440) is a cross-sectional diagram (not to scale) of a stack-up of layers for a metal face transaction card, including an embedded inductive coupling chip module, according to an embodiment of the invention.

Figure 9A:
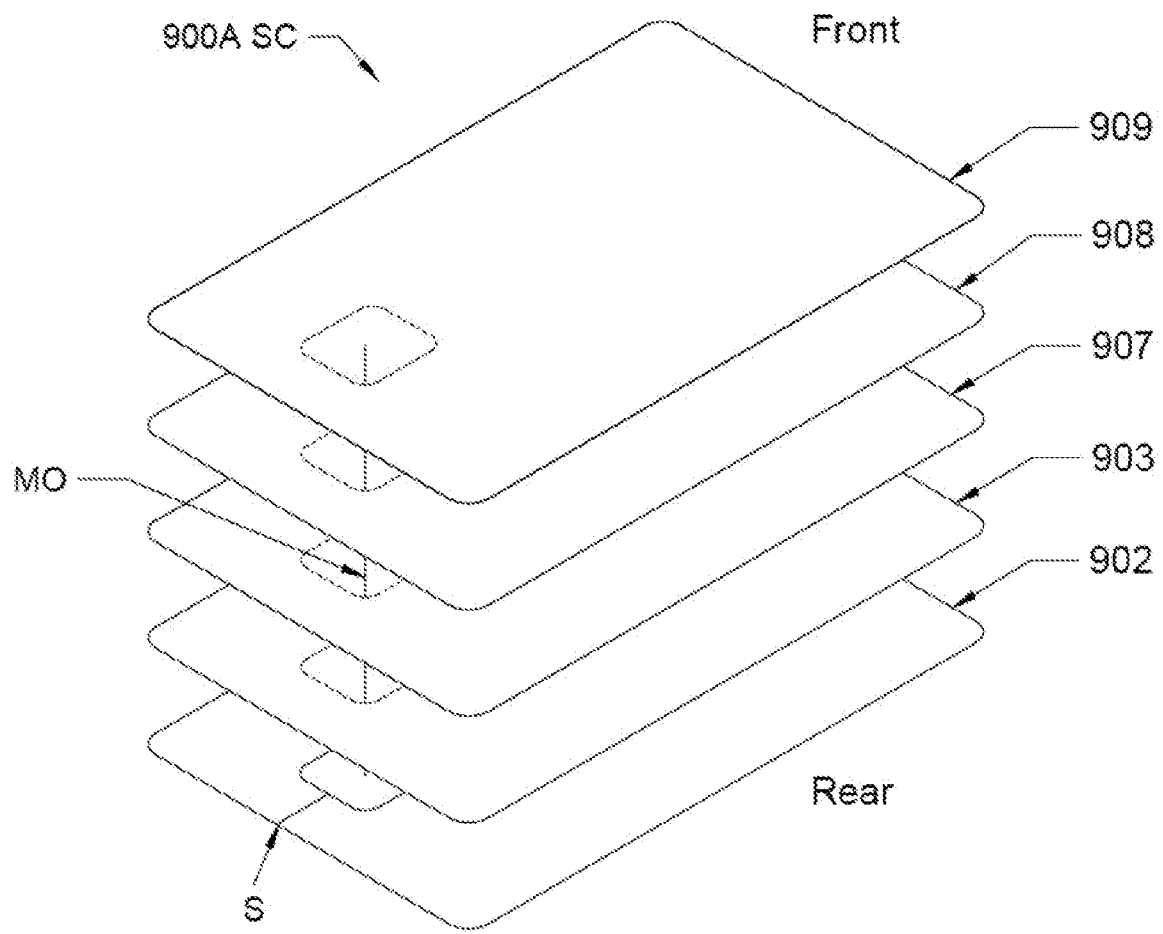

FIG. 9A (compare FIG. 9A of Ser. No. 16/991,142; compare FIG. 6 of U.S. 62/894,976) is a diagram (exploded, perspective view) of a card stack-up showing different layers applied to a metal surface (metal inlay) disguising the presence of a discontinuity by using primer, polymer coatings (synthetic resin), and ink, according to the invention.

Figure 9B:
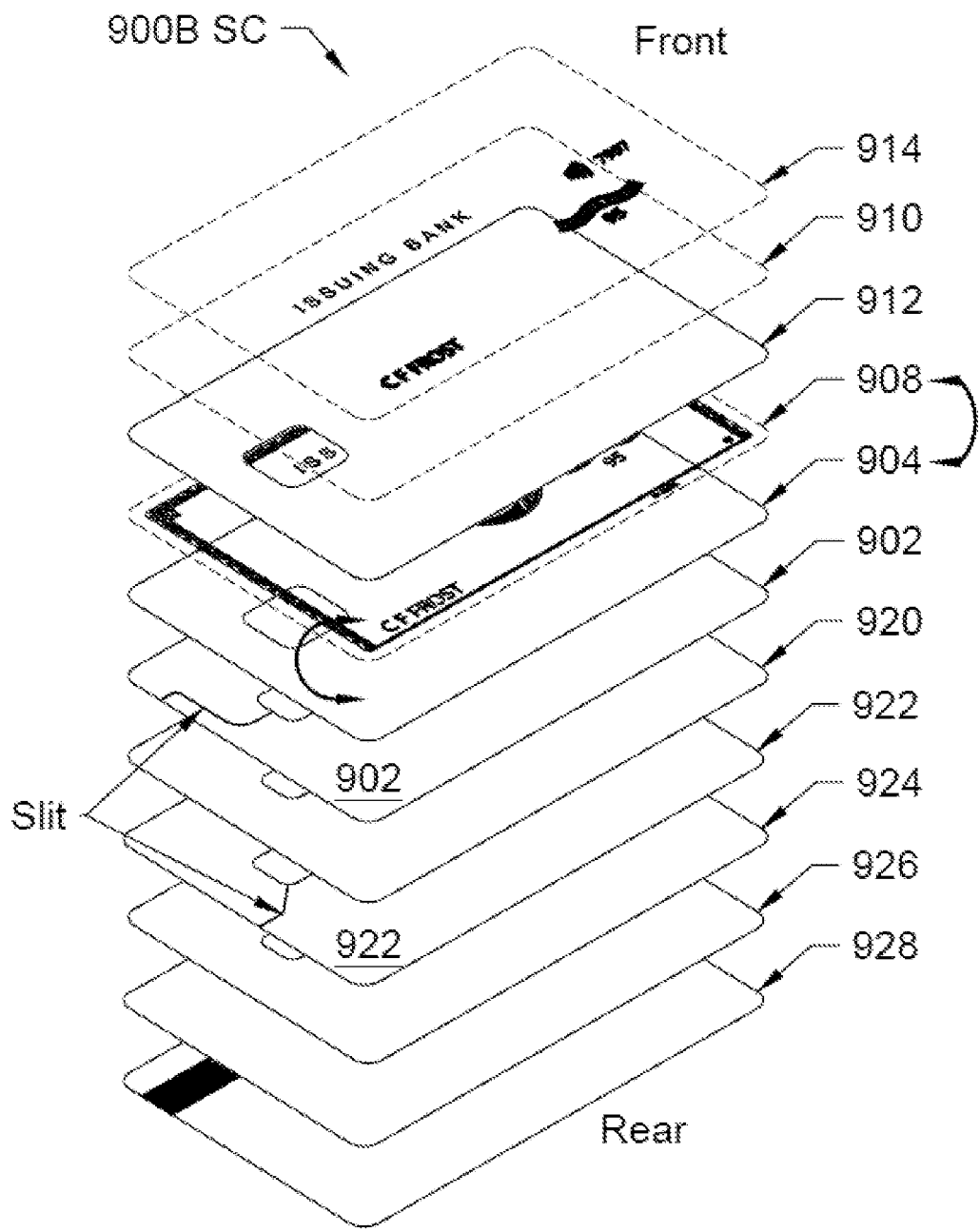
Figure 9C:
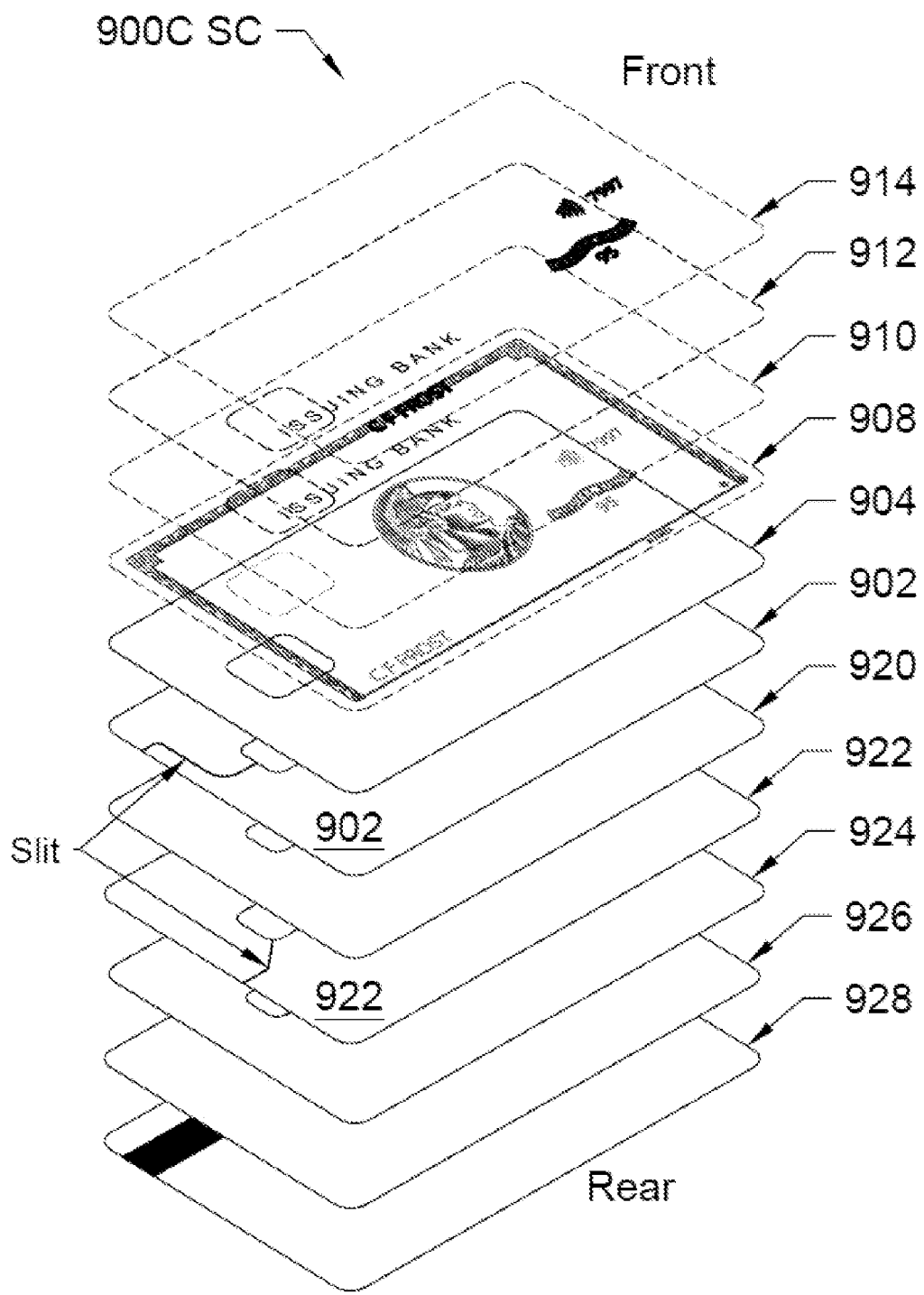
Figure 9D:
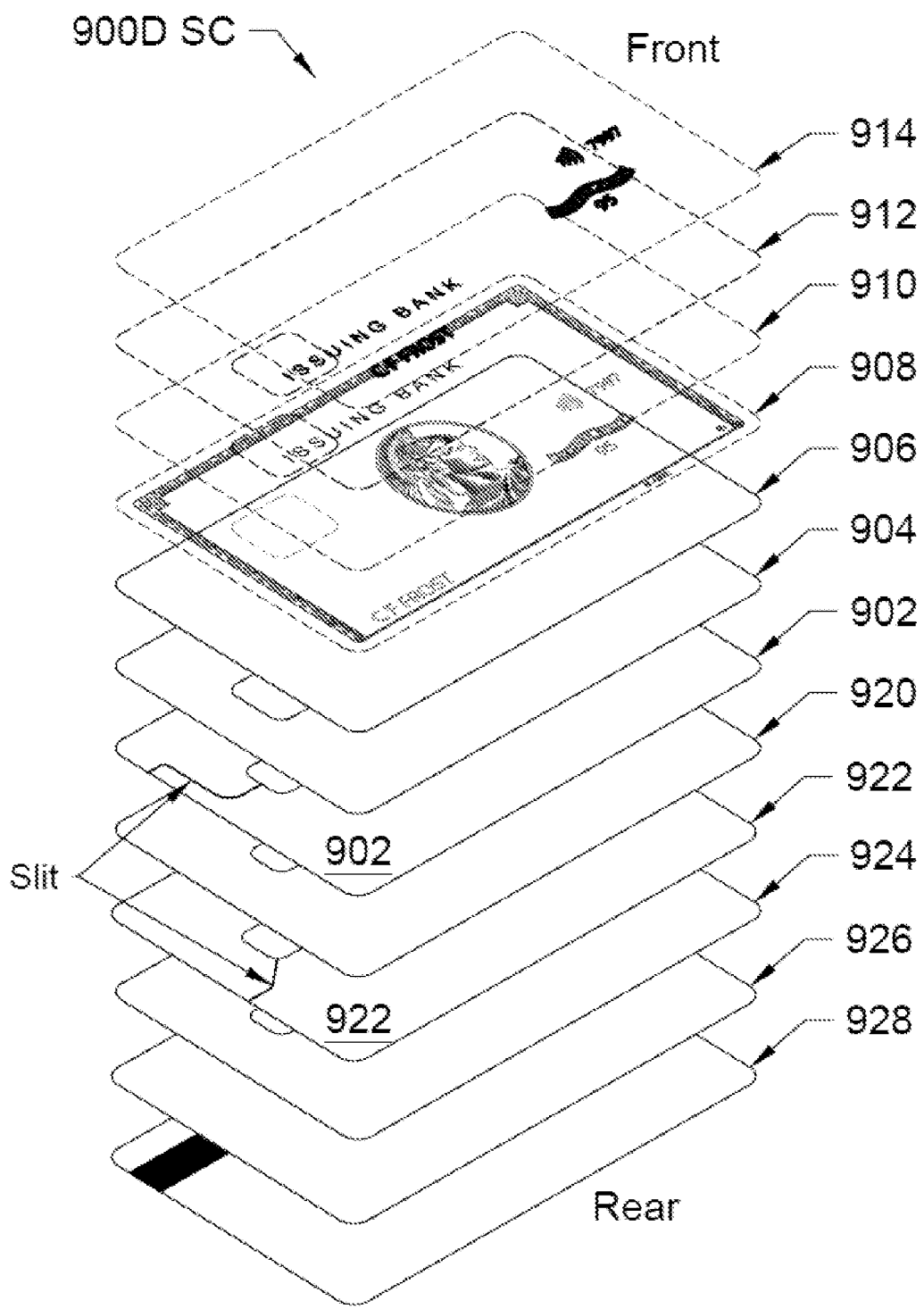

FIGS. 9B, 9C and 9D (compare FIGS. 9B, 9C and 9D of Ser. No. 16/991,142) are diagrams (exploded, perspective view) of a card stack-up showing different layers of the card, according to the invention.

Figure 9E:
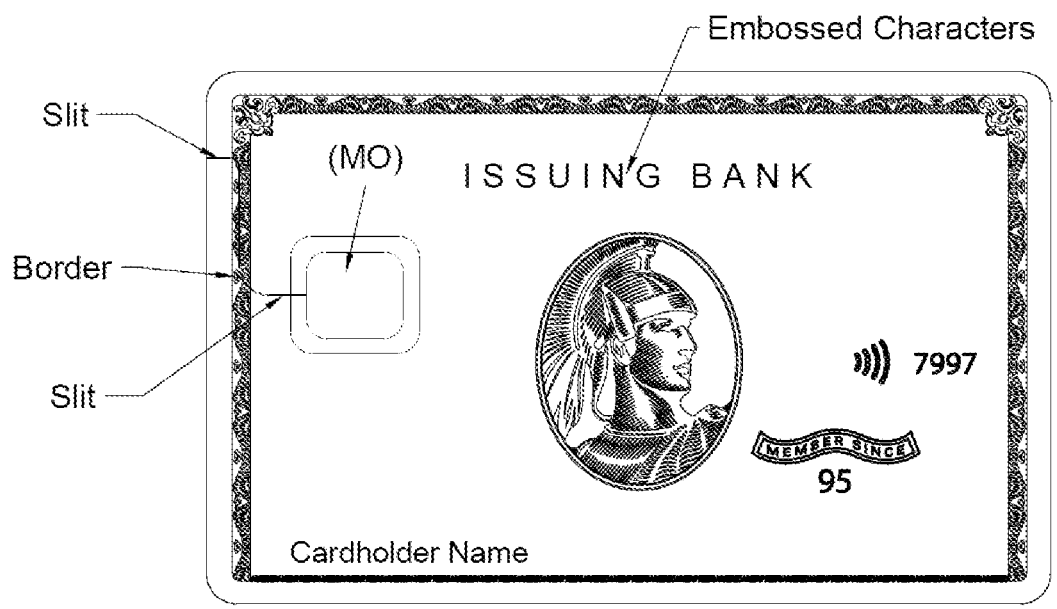
Figure 9F:
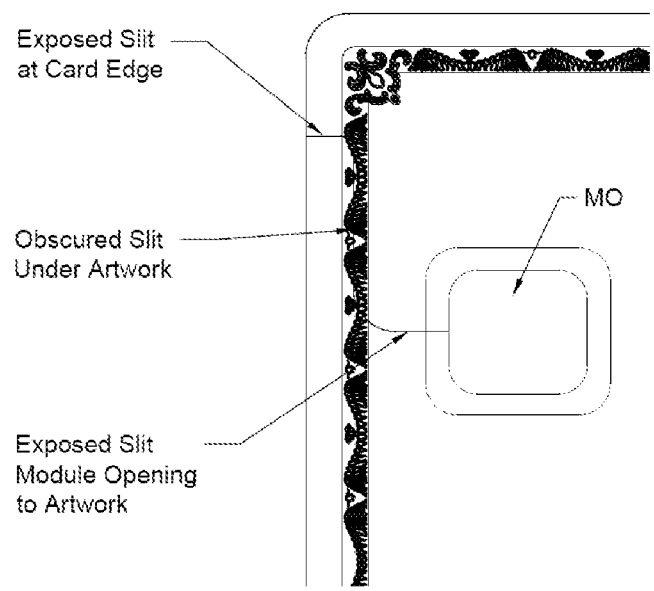
Figure 9G:
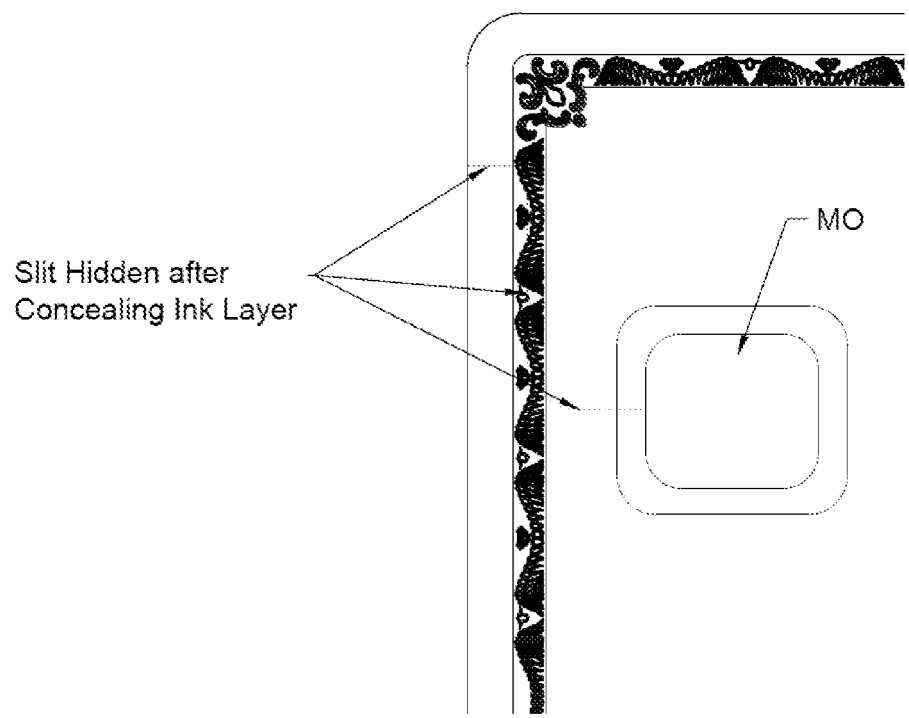

FIGS. 9E, 9F and 9G (compare FIGS. 9E, 9F and 9G of Ser. No. 16/991,142) are diagrams (plan view) of smartcards (or selected portions thereof), according to the invention.

Figure 9H:
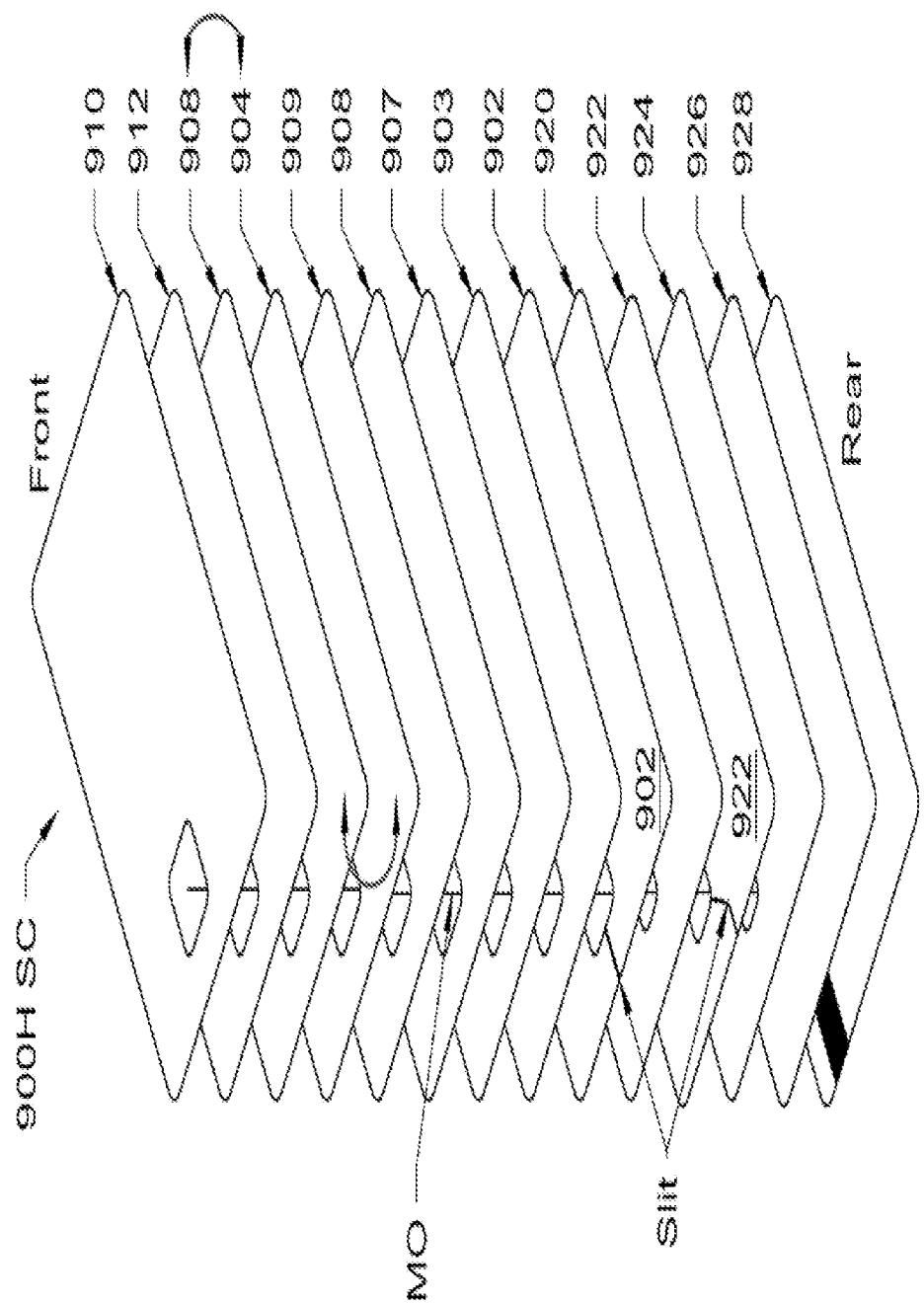

FIG. 9H is a diagram (exploded, perspective view) of a card stack-up, according to the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards and electronic tags in the form of pure contactless cards, dual interface cards and electronic identity cards may be discussed as exemplary of various features and embodiments of the invention(s) disclosed herein. As will be evident, many features and embodiments may be applicable to (readily incorporated in) other forms of smartcards, such as EMV payment cards, metal composite cards, encapsulated metal cards, solid metal cards, metal veneer cards, metal hybrid cards, metal foil cards, access control cards and secure credential cards. As used herein, any one of the terms "transponder", "tag", "smartcard", "data carrier", and the like, may be interpreted to refer to any other of the devices similar thereto which operate under ISO 14443 or similar RFID standard.

FIG. 1A is a highly simplified cross-sectional diagrams of a primarily metal card assembly for manufacturing a durable metal card. The metal layer 101 may include an optional adhesive film (103a, 103b) above it top and bottom surfaces. The optional adhesive films 103a, 103b are desirably used when the top and/or bottom surface of the metal layer 101 has been "brushed". The "brushing" may be accomplished by forming indentations in the surface of the metal layer done to give the metal layer and the resultant card a distinctive feature. The films 103a and 103b when applied to the brushed metal surfaces tend to smooth out the sharp edges and fill the depressions present on the brushed surfaces. This solves a problem when the ridges formed in the metal surfaces due to the "brushing" exceed the thickness of the hard coat layer and tend to wear through the hard coat layer. The core metal card subassembly (C in FIG. 1A) is shown to include a magnetic stripe and/or a hologram layer 120 on the bottom side of the metal layer. In FIG. 1A, the card assembly sandwich also includes a sub assembly Ba applied (sandwiched) on top of the optional adhesive film 103a and a subassembly Bb applied (sandwiched) below layer 120.

Note that the metal layer 101 may be stainless steel and have a "whitish" color. There is provided in subassemblies Ba and Bb a primer layer 110a, 110b which may be colored to give the card a desired color. Alternatively, the primer layer may be clear.

The sandwich assembly shown in FIG. 1A is subjected to a lamination process under predetermined pressure and temperature. Thereafter, the carrier and release layers are removed.

In FIG. 1A, the thickness of the metal layer 101 may be, but need not be, nearly the full thickness of the card As shown in FIGS. 1B and 1C, a hard coat sub-assembly B is formed to be combined with a core subassembly (A) to form a durable card. Subassembly B is referred to herein as a hard coat subassembly. As shown in FIG. 1B, subassembly B includes a special carrier layer 104 on which is positioned a release layer 106 on which is formed a hard coat layer 108 on which is formed a primer layer 110 to which is attached an adhesive layer 112.

The layers forming subassembly B can come in rolls or sheets (films) which are stacked on top of each other in the prescribed order and then processed (combined) in the following manner Heat and pressure are applied to the layers forming subassembly B fusing the stack of sheets (or rolls) together. The entire lamination process may occur in one or two steps depending on the equipment available.

That is, subassemblies A and B may be laminated separately and then combined. Alternatively, all the layers of subassemblies A and B can be stacked together as shown in FIG. 1C and then laminated at the same time.

The layers of subassembly B may have significant properties, as discussed below:

a—special carrier layer 104, the carrier material is typically polyester, and is typically 0.00075 inches (19.1 µm) thick. The carrier layer is formed so that a release layer and a hard coat layer (also primer and adhesive) can be formed thereon and such that the carrier and release layer can be removed, leaving the hard coat layer (108a, 108b) as the top (or bottom) layer of the card. The carrier layer 104 is important due to being specially designed to be compatible with the lamination process and to impart a special finish to the hard coat on the card.

b—The release layer 106 material is, by way of example, polyethylene wax and is approximately 0.00025 (6.4 µm) inches thick.

c—hard coat layer 108—The hard coat layer may be formed of nano-particles, such as silicate nanoparticles, zinc oxide nanoparticles, silicon dioxide crystalline nanoparticles, or any other suitable nano-particles with a suitable carrier such as a solvent of water based acrylates, vinyls, urethane or the like. The hard coat can be applied by coating techniques such as gravure, reverse roll, direct roll, or slot coating. This avoids the size limitation of the vapor depositing equipment. The hard coat layer (108a, 108b) is scratch resistant and provides a very strong and long lasting surface. Bending and abrasion testing has shown that a plastic card with nano particle coating is superior to any of the e-coat jewelry finishes currently in use.

d—Primer layer 110—material is typically a plastic material such as polyvinyl dichloride, or any like material, and is typically 0.0003 inches (7.6 µm) thick. The primer layer may be made to have many different colors by adding colorants, dyes or pigments, to the plastic primer layer. This is very significant since it enables the manufacture of colored durable cards much more cheaply than using other known techniques. The color is compounded with the primer and solvents prior to its application to the sheet or roll.

e—Adhesive layer 112—may be, for example, polyvinyl acetate (PVA or PVAC), or any like adhesive or glue-like material. The adhesive layer must be such that it enables subassembly B to be bonded to a core subassembly (e.g., A); the subassembly whose components need to be protected.

The various layers of subassembly B are bonded together in a platen press at a predetermined temperature for a predetermined time at a given pressure (e.g., 300 degrees F. at 200 psia for 10 minutes).

A core subassembly (e.g., A) and a hard coat subassembly B are then combined together as shown in FIG. 1C. The two subassemblies are then bonded (or laminated) together at a predetermined temperature for a predetermined time at a given pressure (e.g., 290 degrees F. at 200 psia for 8 minutes).

Alternatively, all the layers of subassemblies A and B could be bonded (sandwiched) together in a one step process if the adhesive system is designed for the application.

The carrier layer 104 and the release layer 106 are then removed. Note that the hard coat subassembly with the carrier and release layer removed is identified as B 1 in the drawings. The plastic carrier layer 104 and release layer 106 are hand stripped by a lamination operator when breaking open the completed sandwiches (assemblies).

A card with the hard coat layer has the following properties: uniform surfaces which are scratch and abrasion resistant.

Laserability

A laser (e.g., a YAG laser) can be used for personalization of the resulting outside card surface. Note that a lasering operation can be performed at many different points during the manufacturing process. The lasering may be performed at or on the surface of a card assembly or two layers within the core subassembly.

Laserability of cards which include only plastic layers— As shown in FIG. 1C, selected layers (e.g., clear PVC laminate layers 102a, 102b or in an optional PVC overlay) of a core subassembly may be formed to contain laser-reactive carbon particles 901. Carbon particles and fumed silica which can be laser-reactive ingredients can be formed in the printed PVC or polymer layer or in the polymer overlay. Heat from the laser (e.g. 402) causes carbon particles in these layers to char and the surrounding area turns dark. With extra power from the layer in the same spot the silica steams off its water and causes the area to turn a light color. Thus the laser is capable of making both light and dark marks on the same plastic surface.

Laserability of Cards which Include a Metal Layer

This process shows good contrast and is very secure since the hard coat layer can be ablated down to the bare surface of the underlying metal. Note the hard coat layer is either ablated if it is in direct contact with the metal surface or unaffected (if adhesive and plastic layers are attached to the metal surface) depending upon how the print and background qualities of the card affect the laser beam reflection and absorption. Sometimes, with a powerful laser the surface of the metal may also be affected causing bright bare metal to remain.

FIG. 1D is similar to FIG. 1A except that an additional printed clear PVC layer 105a is applied above the metal layer 101 and an additional printed clear PVC layer 105b is applied below the metal layer 101. The PVC layers 105a, 105b, enable the metal layer 101 of FIG. 1D to be made thinner than the metal layer 101 of FIG. 1A. For example, the thickness of its metal layer may be ⅓ that of FIG. 1A. FIG. 1D may be referred to as a durable card with an "embedded" metal layer.

An overview of the general processing steps performed in the manufacture of cards is shown in FIG. 1E. As indicated in step 701 of FIG. 1E, forming a "core" subassembly is one step in the process of making cards. As indicated in step 703 of FIG. 1E, another step in the process is forming a hard coat subassembly B having a structure of the type shown in FIG. 1B.

The next step as shown in step 705 of FIG. 1E, is forming a "sandwich" comprising the step of attaching a hard coat subassembly to the top and bottom sides of a core subassembly or to only one side of the core subassembly (as shown, for example, in FIG. 1C).

The next step as shown in step 707 of FIG. 1E is to laminate the sandwich to form a reliable and firm card. Of significance in the manufacture of cards is the use of a silicone rubber plate designed to ensure that air bubbles are removed.

The next step shown in step 709 of FIG. 1E is the removal of the special carrier and release layer leaving the exposed hard coat layer(s). After the removal of the carrier and release layers a resultant card is produced as per step 711.

Also of significance in the manufacture of cards is a lasing step to personalize/write on a metal core layer or on a PVC core layer of the card. The lasing step can be selectively performed at any of several points during the process of making the cards (e.g., after step 701, or 705 or 707 or 709 or 711).

Applying "Printed Information" to the Substrate Information (103a, 103b) may be printed in, or on, a core polyvinyl chloride (PVC) layer 101, refer to FIG. 1C.

FIG. 1D is similar to FIG. 1A except that an additional printed clear PVC layer 105a is applied above the metal layer 101 and an additional printed clear PVC layer 105b is applied below the metal layer 101.

According to the teachings of the Prior Art, Primer (110, 110a) and Adhesive (112, 112a) is required between the Printed Info (103a) on the Clear PVC (102a), on Metal (101) or on Printed Clear PVC (105a), and the Hard Coat (108, 108a).

A significant difference between the prior art as presented, for example, in FIG. 1B and the invention(s) disclosed herein is the exclusion of a special carrier layer 104 on which is positioned a release layer 106 on which is formed a hard coat layer 108. Instead the hard coat layer is formed on a single release-carrier layer, thus simplifying the manufacturing process.

The release-carrier layer may comprise a matte polyester film having a thickness of 23 µm. FIG. 2 is a cross-sectional diagram of a hard coat layer on a release-carrier layer intended to be laminated to a metal layer or layers or to a clear PVC layer (overlay) protecting printed information on a PVC layer or PETG layer, to form a scratch resistant metal transaction card.

FIG. 3 is a highly simplified cross-sectional diagram of an "embedded" metal card assembly for manufacturing a durable metal card in accordance with the invention. An exemplary stack-up of the card 300 is illustrated (from front-to-rear), as follows:

302 release-carrier layer
  304 hard coat layer
  306 clear PVC—front overlay layer
  308 ink
  310 primer (color or clear)
    *the layers 308 and 310 may be switched with one another
  312 clear PVC (front transparent PVC print layer)
  314 adhesive film or transparent PVC layer with an adhesive coating
  316 metal layer

*for contactless, the metal layer may have a slit (S) to function as a coupling frame (CF)
*for contact only, no slit is required
318 adhesive film or transparent PVC layer with an adhesive coating
320 clear PVC (rear transparent PVC print layer)
322 primer
*the layers 320 and 322 may be switched with one another
324 ink
326 clear PVC—rear overlay layer
328 magnetic stripe/hologram
330 other elements such as signature panel, hologram As indicated above, in this and other smartcard embodiments disclosed herein, the metal layer(s) may have slit(s) to enable the card to operate contactlessly. See, for example, U.S. Pat. No. 9,475,086 (2016 Oct. 25; Finn et al.) and U.S. Pat. No. 9,798,968 (2017 Oct. 24; Finn et al.) which disclose incorporating a slit extending from a peripheral edge of a metal layer (ML) or a metal card body (MCB) to a module opening (MO) for receiving a transponder chip module (TCM).

A front design layer (1-DL) may comprise layers 308 and 310, on layer 312.

The layers 308, 310, 312 may be laser-treated to have printed information.

A rear design layer (RDL) may comprise layers 320 and 322, on layer 318. The layers 320, 322, 318 may be laser-treated to have printed information.

The position of the primer or adhesion promoter 310 and 322 relative to the ink 308 and 324 may be interchanged with the primer applied on top of the ink. In some instances, the primer may not be required in the printing application. In other applications, the PVC layer is corona treated to increase the surface energy of the synthetic film, to improve the wettability and adhesion of inks, coatings or adhesives thereto. 314 (adhesive film) may be replaced by a transparent PVC layer with an adhesive coating (PVC WA), equally 318 (adhesive film) may be replaced by a transparent PVC layer with an adhesive coating (PVC WA), the thickness of the PVC and adhesive backing is typically 60 μm.

Information may be reverse digitally printed on the clear PVC layers 306, 326, which may be referred to as front and rear overlay layers (FOL, ROL), respectively. The overlay layers may be laser engraved. In addition, it is also feasible to print directly to the metal layer 316 and CNC engrave directly into the ink 308, 324.

UV curable ink (flexible) is a stretchable fluid and very suitable for reverse digital printing on overlay material. Hard ink on the other hand is very durable and is deposited on the front or rear surface of a card body, post lamination. The hard ink can also be screen printed, but without the fine texture that can be achieved with digital inkjet printing.

A detailed description of FIG. 3 with dimensions is provided below. An important aspect of the stack-up construction is that the complete assembly is laminated "in one go" (i.e., all at once, in a single laminating step), rather than in several separate sub-assembly lamination steps as suggested by the Prior Art. The front and rear design layers with printed information can be digitally printed, offset lithography printed, screen printed, gravure printed, or a combination thereof.

The purpose of the primer is to facilitate better adhesion of the ink to the material (CLEAR PVC 312). The overlay material may also capture the magnetic stripe. The security elements, signature panel and hologram, may be hot stamped to the overlay material. The primer can be clear or colored (by means of a pigment). The primer is soft and tacky after application with a thickness of approximately 8 μm. The Adhesive Film or Adhesive Layer bonds the metal layer or metal layers (aka metal inlay) to a synthetic layer such as White PVC or clear PVC or PETG, or any suitable plastic layer. The synthetic layers may be transparent, translucent, white or any color.

The double-sided adhesive on a PET or PEN carrier layer may have a thickness of 63 or 75 μm and may be replaced by a free standing thermosetting epoxy film (having a thickness of ~25 μm) on a release liner for attaching a synthetic layer to a metal layer.

FIG. 3 illustrates a stack-up construction of an embedded metal smartcard (aka Metal Core Smartcard), 14 grams in weight, with the following materials and dimensions:

| Front Side | | | |
|---|---|---|---|
| RELEASE-CARRIER LAYER | | 302 | |
| | Matte Polyester Film 23 μm | | |
| HARD COAT LAYER | | 304 | ~12 μm |
| | Scratch Resistant Coating (Total thickness of film: 35 μm) Laser engravable, or laser passes through to engrave 306 | | |
| CLEAR PVC | | 306 | 50 μm |
| | Front Overlay (PVC) with Adhesive Backing - Laser Engravable (Alternatively: 2.5 mils overlay: 63.5 μm) | | |
| PRINTED INFO | | 308 310 | ~20 μm |
| | INK 308 - UV Curable Flexible Ink (0.5 mils-13 μm) - Digital or Offset Printing PRIMER 310 - Adhesion Promoter (0.3 mils-7.6 μm) - Silk Screen Printed | | |
| CLEAR PVC LAYER/ WHITE PVC LAYER | | 312 | 125 μm |
| | Transparent PVC Print Layer Front Design Layer on PVC or PETG - White, Clear or Translucent | | |
| ADHESIVE FILM/ ADHESIVE | | 314 | 64 μm |
| | Double-sided Adhesive on a PET or PEN Carrier Layer, Transparent PVC Layer with an Adhesive Backing, or an Adhesive Film 2.5 mils | | |
| METAL | | 316 | 304 μm |
| | Single Metal Layer 12 mils (Stainless Steel) with Slit (Metal Inlay) (optional with print information) | | |

| Rear Side | | | |
|---|---|---|---|
| ADHESIVE FILM | | 318 | 64 μm |
| | Double-sided Adhesive on a PET or PEN Carrier Layer, Transparent PVC Layer with an Adhesive Backing, or an Adhesive Film 2.5 mils | | |
| CLEAR PVC LAYER/WHITE PVC LAYER | | 320 | 125 μm |

-continued

| | Rear Side | | |
|---|---|---|---|
| PRINTED INFO | Transparent PVC Print Layer Rear Design Layer PVC or PETG - White, Clear or Translucent | 322 324 | 20 μm |
| | PRIMER 322 - Adhesion Promoter (0.3 mils-7.6 μm) - Silk Screen Printed INK 324 - UV Curable Flexible Ink (0.5 mils-13 μm) - Digital or Offset Printing | | |
| CLEAR PVC + MAGNETIC STRIPE | | 326 328 | 50 μm |
| | Rear Overlay (PVC) 326 Laser Engravable with Magnetic Stripe 328 (Alt: 2.5 mils overlay: 63.5 μm, at the position of the Magnetic Stripe 2.8 mils: 71 μm) | | |
| ELEMENTS | Signature panel and hologram | 330 | |

Total thickness: 834 μm Pre-lamination
809 μm Post-Lamination (shrinkage caused by temperature and pressure during lamination)
Note: The adhesive PET or PEN film (adhesive) layer(s) (314, 318) may be replaced by a transparent PVC layer coated on one side with adhesive layer or simply replaced by a free standing adhesive layer having a thickness of 25 μm and changing the thickness of the other synthetic layers.

An alternative stack-up construction for a metal core smartcard is as follows:

| | | | |
|---|---|---|---|
| HARD COAT | Scratch Resistant Coating 0.5 mils | 304 | ~12 μm |
| CLEAR PVC | Overlay Material 2.5 mils | 306 | 64 μm |
| PRINTED INFO (PI) | Ink 308 - 0.5 mils Adhesion Promoter 310 - 0.3 mils | 308 310 | ~20 μm |
| CLEAR PVC WITH ADHESIVE (PVC WA) | PVC WA 5.5 mils | 313 | 140 μm |
| METAL | Single layer of metal with reinforced slit 17 mils | 316 | 432 μm |
| CLEAR PVC WITH ADHESIVE | PVC WA 5.5 mils | 319 | 140 μm |
| PRINTED INFO (PI) | Adhesion Promoter 322 - 0.3 mils Ink 324 - 0.5 mils | 322 324 | ~20 μm |
| CLEAR PVC + MAGNETIC STRIPE | Overlay 326 with magnetic stripe 328 - 2.5 mils | 326 328 | 64 μm |

Total thickness: 35.1 mils (892 μm) Pre-lamination, whereby the metal core can be reduced in thickness to meet ISO 7816 standard.

The difference between this stack-up and what was shown in FIG. 3 is that this construction has a thicker metal core with a reinforced slit.

In digital printing with a Mimaki inkjet printer, the ink 308 can be applied first to the PVC WA with the adhesion promoter 310 applied to the ink.

It should be understood that the thickness dimensions set forth herein for the various embodiments are typically pre-lamination, and are approximate. Some layers may be thicker than stated, some may be thinner.

FIG. 4 is a highly simplified cross-sectional diagram of a "hybrid" metal card assembly or metal face card assembly as presented in detail below, for manufacturing a durable metal transaction card in accordance with the invention. An exemplary stack-up of the card 400 is illustrated (from front-to-rear), as follows:

401 hard ink
404 hard coat
406 clear PVC
408 ink (Printed Information (PI))
414 adhesive
416 metal layer
  * for contactless, the metal layer may have a slit (S) to function as a coupling frame (CF)
  * for contact only, no slit is required
419 clear PVC WA (WA=with adhesive)
422 primer
424 ink (Printed Information (PI))
426 clear PVC
  440 represents information inscribed into and onto the clear PVC 426
428 magnetic stripe FIG. 4 is similar to FIG. 3 except that the front clear or white PVC layer may be eliminated. The metal layer of FIG. 4 may therefore be thicker than that of FIG. 3.

FIG. 4 may be referred to as a "hybrid durable metal card" or "durable metal face transaction card". Note that the resultant cards formed from the assemblies shown in FIGS. 3 and 4 have a hard coat layer on their top surface, optionally on their bottom surface.

FIG. 4 illustrates a Stack-up Construction of an exemplary metal hybrid smartcard, 20 grams in weight, with the following materials and dimensions:

| | Front Side | | |
|---|---|---|---|
| POST LAMINATION PRINT | Embossed effect using digitally printed Hard Ink with a thickness of approx. 1 mil Primer - 0.3 mils | 401 402 | 25 μm 8 μm |
| HARD COAT | Optional on release-carrier layer or deposited ~0.5 mils | 404 | ~12 μm |
| CLEAR PVC | Front overlay 2.5 mils, with reverse printing to overlay | 406 | 64 μm |
| REVERSE PRINTED INFO (PI) | INK 408 - UV Curable Flexible Ink (0.5 mils) (Optionally, the clear PVC can be laser engraved) | 408 | 13 μm |
| ADHESIVE FILM | Double-sided Adhesive on PET or PEN Carrier 2.95 mils | 414 | 75 μm |
| METAL | Single Metal Layer 20 mils (Stainless Steel) with Reinforced Slit (Metal Inlay) | 416 | 508 μm |

| Rear Side | | |
|---|---|---|
| CLEAR PVC WITH ADHESIVE ATOP | 419 | 127 μm |
| | PVC WA 5 mils (also possible with a separate screen printed adhesive layer) | |
| PRINTED INFO (PI) | 422 424 | ~20 μm |
| | PRIMER 422 - Adhesion Promoter (0.3 mils-7.6 μm) INK TOP PRINT 424 - UV Curable Flexible Ink (0.5 mils-13 μm) | |
| CLEAR PVC + SILVER MAGNETIC STRIPE | 426 428 | 64 μm |
| | Rear Overlay (PVC) 426 2.5 mils, Laser Engravable with Magnetic Stripe 428 | |
| ELEMENTS (not shown) | | |
| | Signature Panel and Hologram | |

Total thickness pre-lamination: 883 μm (34.7 mils)
Total thickness post-lamination: 840 μm (33.0 mils)
ISO dimensional limits: Min 0.68 mm to max 0.84 mm-Min 0.027 Inch to max 0.033 Inch In an alternative printing arrangement, the ink 424 can be applied first to the PVC WA with the adhesion promoter 422 applied to the ink.

Through selective patterning of flexible and hard ink during the deposition process, it is possible to camouflage a slit in a metal face smartcard. The slit can be filled during digital printing.

The hard coat layer (not shown) may be applied to the clear PVC or overlay layer. The hard coat may be on a release-carrier layer and attached to the overlay layer during hot and cold lamination. Alternatively, the hard coat in fluid form as an ink or varnish coating may be screen printed, roller coated, mist-coated or sprayed onto the surface requiring protection from scratches. The ink or varnish coating may be laser engravable.

In this card construction, the single metal layer (20 mils) with slit is reinforced to stabilize the mechanical stability of the metal transaction card.

It is possible to digitally print on an adhesive layer instead of lithographic printing on a PVC layer with a thickness of 125 μm, and protecting the digital print on the adhesive layer with an overlay layer, resulting in the following.

| | | |
|---|---|---|
| CLEAR PVC | 406 | 50 μm |
| | Front Overlay (PVC) - Laser Engravable (1.96 mils) | |
| PRINTED INFO | 408 | ~13 μm |
| | INK - UV Curable Flexible Ink (0.5 mils) Digital Printing on Adhesive Film | |
| ADHESIVE FILM | 414 | 75 μm |
| | Double-sided Adhesive on PET or PEN Carrier (2.95 mils) | |

Alternatively, printing may be performed on an adhesive film with a release liner.

FIG. 5 is a highly simplified cross-sectional diagram of a "hybrid" metal card assembly or metal face card assembly for manufacturing a durable metal transaction card having a flat solid front color surface in accordance with the invention.

An exemplary stack-up of the card 500 is illustrated (from front-to-rear):
504 hard coat
508 ink (flexible ink)
Metal Inlay (2 layers of 8 mils metal with slits (fish hook shape) separated by a dielectric layer) 18 mils
  515a metal layer
  517 dielectric
  515b metal layer
   * the metal layers 515a, 515b may have slits (S) to function as coupling frames (CF)
  518 adhesive
  520 clear PVC
    522 primer
    524 ink (printed information (PI))
  526 clear PVC
    540 represents information inscribed into and onto the clear PVC 526
  528 magnetic stripe FIG. 5 shows a stack-up construction of an exemplary metal face smartcard having a front surface with a flat and solid color Metal cards are often desired to have a single color scheme rather than having busy graphics which require specialized printing. The metal cards can be digitally printed using UV inks and protected by a hard coat as proposed below.

| Front Side | | |
|---|---|---|
| HARD COAT | 504 | ~12 μm |
| | Diamond coat with low activation temperature 0.5 mils | |
| ARTWORK | 508 | ~13 μm |
| | Ink 508: 0.5-0.6 mils, digitally printed flexible ink | |
| METAL LAYER | 515a | 203 μm |
| | 304 Stainless Steel 8 mils with slit (fish hook shape) | |
| DIELECTRIC LAYER | 517 | 75 μm |
| | Double-sided Adhesive on PET or PEN Carrier 2.95 mils | |
| METAL LAYER | 515b | 203 μm |
| | 304 Stainless Steel 8 mils with slit (fish hook shape) | |

| Rear Side | | |
|---|---|---|
| ADHESIVE LAYER | 518 | 25 μm |
| | Free Standing Adhesive Film - 1.0 mil | |
| CLEAR PVC | 520 | 152 μm |
| | Transparent PVC, e.g. digitally printed (note Indigo (corona) treated material on top helps with the adhesion) 6 mils | |
| PRINTED INFO | 522 524 | ~20 μm |
| | Primer 522: 0.3-0.4 mils Ink 524: 0.6 mils | |
| CLEAR PVC + BLACK SILVER MAGNETIC STRIPE | 526 528 | 64 μm |
| | Laser Engravable Overlay 526 with Magnetic Stripe 528 (2.5 mils) | |

Rear Side

| ELEMENTS | 530 |
|---|---|
| Signature Panel and Hologram | |

Total thickness: 30.2 mils (767 μm) Pre-lamination 740 μm post-lamination (two metal layers, not a lot of plastic shrinkage)

In an alternative printing arrangement, the ink 524 can be applied first to the PVC WA with the adhesion promoter 522 applied to the ink.

An alternative approach to the abovementioned process is to use a single layer of metal (metal inlay with or without a micro slit), coated, and followed by a heat cure process.

The following exemplary steps may be performed to manufacture the card:

In a first step, the metal is cleaned in a chemical bath to remove oil and dirt, but also to roughen the surface for better adhesion of the ink.

In a second step, the metal inlay is coated with a primer using a roller/curtain coater.

In a third step, the ink is applied using a screen-printing process.

The ink is heat cured in an oven.

In the last stage of the process, a clear hard coat is applied, and heat cured in an oven at an elevated temperature of 400° F.

The clear hard coat is a high gloss layer and is applied by dispersing polyurethane, a blend of polyester and polyurethane, acrylic or epoxy using coating techniques such as reverse or direct roll.

The double metal layer with each layer having a thickness of 8 mils (~200 μm) may be replaced by a non-uniform stack-up, with the top metal layer having a thickness of 12 mils (~300 μm) and the lower metal layer with a thickness of 6 mils (~150 μm) to provide weight and mechanical sturdiness. One metal layer may be stainless steel while the other metal layer may be titanium, so that the drop acoustics of the metal card body sound like metal. An inductive coupling chip module may be implanted in the card body with the P1 cavity having a depth of 250 μm and the P2 cavity a depth of maximum 600 μm.

FIG. 6 depicts a metal face transaction card having an exposed metal surface with a flat color or a color with a grain structure which has been baked on at an elevated temperature (~400° F.). The hard coat protects the underlying color coated metal layer which can be laser etched to personalize the transaction card. The slit in the metal layer is partially disguised by the baked-on ink. The surface can be mechanically engraved to create a payment scheme logo. The stack-up construction comprises:

Hard coat layer
Metal layer with baked-on-ink having a slit for contactless communication
Adhesive Layer
Print Layer with a matching color to the metal layer
Overlay layer with magnetic stripe which is laser engravable An exemplary stack-up of the card 600 is illustrated (from front-to-rear):

604 hard coat
609 baked on ink layer (primer, ink, protective coating (polyurethane, a blend of polyester and polyurethane, acrylic or epoxy))

Metal Inlay (2 layers of metal (12 mils and 6 mils) with slits (fish hook shape) separated by a dielectric layer) 20.5 mils
615a metal layer
617 dielectric
615b metal layer
* the metal layers 615a, 615b may have slits (S) to function as coupling frames (CF)
618 adhesive
620 clear PVC
622 primer
624 ink (printed information (PI))
626 clear PVC
628 magnetic stripe FIG. 6 shows an exemplary stack-up construction of a metal face smartcard having a front surface with a flat and solid color

Front Side

| | | | |
|---|---|---|---|
| HARD COAT | | 604 | ~12 μm |
| | Optional Diamond coat with low activation temperature 0.5 mils | | |
| BAKED ON INK LAYER | | 609 | ~20 μm |
| | Primer, Ink and Laser Engravable Protective Coating | | |
| METAL LAYER | | 615a | 305 μm |
| | 304 Stainless Steel 12 mils with slit (fish hook shape) Metal layer with baked-on-ink having a slit for contactless communication | | |
| DIELECTRIC LAYER | | 617 | 75 μm |
| | Double-sided Adhesive on PET or PEN Carrier 2.95 mils | | |
| METAL LAYER | | 615b | 152 μm |
| | 304 Stainless Steel 6 mils with offset positioned slit as supporting layer | | |

Rear Side

| | | | |
|---|---|---|---|
| ADHESIVE LAYER | | 618 | 25 μm |
| | Free Standing Adhesive Film - 1.0 mil | | |
| CLEAR PVC | | 620 | 152 μm |
| | Transparent PVC, e.g. digitally printed (note Indigo (corona) treated material on top helps with the adhesion) 6 mils | | |
| PRINTED INFO | | 622 624 | ~20 μm |
| | Primer 622: 0.3-0.4 mils Ink 624: 0.6 mils Print Layer with a matching color to the metal layer | | |
| CLEAR PVC + BLACK SILVER MAGNETIC STRIPE | | 626 628 | 64 μm |
| | Laser Engravable Overlay 626 with Magnetic Stripe 628 (2.5 mils) | | |
| ELEMENTS | | 630 | |
| | Signature Panel and Hologram | | |

Total thickness: 32.5 mils (825 μm) Pre-lamination Post-lamination: 800 μm post-lamination (again, not much shrinkage, since mostly metal)
* all dimensions set forth herein should be considered to be approximate, unless specified otherwise, and are included to provide some "context" and comparison (e.g., between the thicknesses of the different layers In an alternative printing arrangement, the ink 624 can be applied first to the PVC with the adhesion promoter 622 applied to the ink. If the PVC is corona treated, a primer may not be required.

The hard coat layer can be receptive to an overprint (primer and hard ink) and the hot stamping of a payment scheme hologram.

The layered composition of the hard coat and the release film comprises the barrier coat or diamond coat which provides the scratch resistant protection, a connecting layer (a binding layer with an affinity for the adhesive layer and the diamond coat), an adhesive layer and the polyester release film. The hard/diamond coat can be matt, gloss or have a mechanically brush effect. The hard/diamond coat layer may be laser personalized.

In another embodiment of the invention, the coated baked-on ink layer 609 is receptive to flexible ink by digital printing information directly to the coated surface without a primer. The printed information is scratch protected by the hard/diamond) coat layer 604.

Ink-Baked Metal Inlays

Metal inlays with an array of card body sites (typically in a format of 2×8 or 5×5) having a discontinuity in the form of a slit at each card body position can be coated with decorative patterns and finishes using traditional silk screen and lithographic printing processes. The metal inlays are first cleaned in an alkaline solution to remove any debris and lubricants. A primer is put down to facilitate the ink adhesion and thereafter the surface is screen printed. A high gloss layer is applied by dispersing polyurethane, a blend of polyester and polyurethane, acrylic or epoxy using coating techniques such as reverse or direct roll. The assembly is baked in an oven at a cure temperature of 400° F. The deposited top coat and primer both measure less than 0.001 inches in thickness.

Hard Coat Layer on a Release-Carrier Layer

The high gloss decorative surface on the metal inlay can be further protected with a hard coat layer. The process of assembling the hard coat layer on a release-carrier layer to the metal layer is achieved by a platen lamination process. The release-carrier layer is removed after lamination, leaving the hard coat layer as the top layer of the transaction card.

As an embodiment of the invention it is not necessary to have an energy absorbing buffer layer formed between the hard coat layer and a layer intended to be scribed (e.g., personalized) with a laser beam, or an energy absorbing buffer layer between a laser-reactive layer and a metal layer. (Buffer layer may be disclosed in U.S. Pat. Nos. 7,287,704; 10,311,346; 10,395,153; US 2019/0332907).

Interposed between the release-carrier layer and the hard coat layer is an adhesive layer and an intermediate coating or binder. The hard coat layer is multi-layered in construction. As an embodiment of the invention, the hard coat layer is characterized by a low infrared (IR) absorption, but a high ultraviolet (UV) absorption.

With proper settings (power and pulse energy), it is feasible to etch and mark the UV hard coat layer without apparent beam interaction on the metal.

By the application of ultra-fast lasers (pico- or femto-second lasers), it is feasible to etch or remove the UV hard coat layer and interact with the metal, without thermal degradation of the UV hard coat layer.

UV lasers may be used. IR lasers may also be used. The laser treatment to the protective coating (coating of lacquer/varnish/ink) or the UV hard coat layer (film) on a release carrier layer can be ultraviolet, infrared or green, to impart information on or into the layer.

FIG. 7 shows the following exemplary stack-up of layers for a card 700, from a front surface (side) of the card to a rear surface (side) of the card:
  release-carrier layer 702
  UV hard coat layer 704
  laser-reactive layer 706
  clear print layer 708
  adhesive layer 710
  metal core layer, or layers 712
    * the metal layer(s) 712 may have slit(s) 724 to function as coupling frames (CF)
  adhesive layer 714
  clear print layer 716
  Laser-reactive layer, with magnetic strips 718

FIG. 7 is a cross-sectional diagram (not to scale) of a metal transaction card comprising; a UV hard coat layer on a release-carrier layer; a clear laser-reactive layer (transparent overlay with an adhesive coating); a transparent or translucent layer on which information is printed using inks; a double-sided adhesive layer on a PEN carrier layer; a core metal layer (or layers) with a slit formed of edge to edge non-magnetic high tensile strength stainless steel, with the rest of the structure of the multi-layered transaction card being symmetrical with a like number of layers of similar dimensions being formed and bonded below the core metal layer as above the core metal layer.

FIG. 8 shows the following exemplary stack-up of layers for a card 800, from a front surface (side) of the card to a rear surface (side) of the card:
  release-carrier layer 802
  UV hard coat layer 804
  overcoat layer 806
  ink layer 808
  primer layer 810
  metal core layer or layers, with slit(s) 824 and module opening(s) 812
  adhesive layer 814
  synthetic layer 816, color-matched to ink layer 808
  laser-reactive layer 818 with magnetic stripe
  module opening 820 for chip module 822, extending into and through the layers 802, 804, 806, 808, 810, 812, as illustrated FIG. 8 is a cross-sectional diagram (not to scale) of a metal face transaction card formed in accordance with the invention, including an embedded inductive coupling chip module. The metal face transaction card with a sandwich-like structure comprising of: a UV hard coat layer on a release-carrier layer; a front face metal layer assembly on which information has been screen printed using a primer and inks protected by an overcoat layer and baked at an elevated temperature of 400° F.; an adhesive layer for bonding a synthetic layer to the metal layer; a synthetic layer having a color scheme which matches the color and texture of the front face metal layer; a transparent laser-reactive layer with magnetic stripe on or within which information can be written using a laser beam.

Laser personalization including payment scheme and issuing bank logos can be performed on the metal face layer prior to laminating a protective overlay layer with a UV hard coat layer, or an overlay layer which is laser engravable with a UV hard coat layer. In certain circumstances the overlay layer or the hard coat layer may be omitted.

In digital printing with a Mimaki inkjet printer, the ink 808 can be applied first to the metal with the adhesion promoter 810 applied to the ink.

As a further embodiment of the invention, the surface properties of the UV hard coat layer may have a surface energy which is receptive to an overprint (primer and hard ink) and the hot stamping of a payment scheme hologram.

The layered composition of the UV hard coat layer and the release film may comprises of the barrier coat or diamond coat which provides the scratch resistant protection, a connecting layer (a binding layer with an affinity for the adhesive layer and the diamond coat), an adhesive layer and the polyester release film. The diamond coat can be matt, gloss or have a mechanically brush effect.

Reinforcing and Disguising a Slit in a Metal Card Body

A laser-cut slit may be reinforced with filler such as a resin, epoxy, mold material, repair liquid or sealant applied and allowed to cure to a hardened state or flexible state. The filler may be dispensed or injection molded.

This disclosure further relates to RFID-enabled transaction cards and, more particularly, transaction cards having at least one layer of metal with a slit. Techniques to camouflage the slit with graphic elements and methods to reinforce the slit in a metal layer are presented.

FIG. 9A shows different layers applied to a metal surface (metal inlay) disguising the presence of a discontinuity by using primer, polymer coatings (synthetic resin) and ink, according to the invention.

FIG. 9B shows different layers in the stack-up construction of a metal face smartcard with the front face metal layer having a shaped slit starting at a perimeter edge of the metal card body and ending at the module opening to form a coupling frame, with the front face metal layer coated with an adhesion promoter or primer, followed by the selective application of ink to print a filigree pattern and graphic elements on the coated metal surface, disguising the presence of the shaped slit behind the printed artwork, with the printed artwork protected by a coating of varnish or ink, and on top thereof raised characters are digitally printed before personalization, according to the invention.

FIG. 9C shows a variation in the stack-up construction of FIG. 9B, interchanging the position of the ink layer bearing the embossed alphanumeric characters, with the protective varnish layer as the final outer layer in the smartcard assembly before personalization, according to the invention.

FIG. 9D shows a further variation in the stack-up construction of FIG. 9C with the addition of a concealing ink layer hiding the presence of the underlying slit. The concealing ink layer is electromagnetic transparent and does not attenuate the field generated by the contactless POS terminal, according to the invention.

FIG. 9E shows a metal face smartcard 900E with a shaped slit commencing at a top corner peripheral edge of the card body, disappearing under the printed border disguising its presence, with the slit descending downwards behind the border to a center position before crossing over to a module opening, according to the invention.

FIG. 9F shows the shaped slit in the front face metal layer of the smartcard 900E and its disappearance under the printed border, according to the invention.

FIG. 9G shows the non-exposed slit in the front face metal layer of the smartcard 900E after the selective deposition of a concealing ink layer to the surface of the metal, according to the invention.

FIG. 9H shows another stackup of a smartcard 900H having components which may be similar to those described in FIGS. 9A,B,C,D.

FIG. 9A shows a front portion of a smartcard comprising: different layers applied to a metal surface (metal inlay) disguising the presence of a discontinuity (slit) in the metal layer by using primer, polymer coatings (synthetic resin) and ink. A rear portion of the card may comprise an adhesive layer, a printable synthetic layer and a laser engravable overlay layer with magnetic stripe.

The stack-up of the card 900 may be, from bottom (rear) to top (front):

902 metal layer (ML) having a module opening (MO) and a slit (S)

MO—module opening (MO) in the metal layer for receiving a TCM (not shown)

S—slit (S) extending from an edge portion of the metal layer to the module opening The metal layer with module opening and slit functions as a coupling frame (CF)

903 clear primer layer over the metal layer

907 coating or sealant over the primer layer

908 baked-on ink layer

909 top coat layer

Each of the layers 903, 907, 908, 909 may have a module opening aligned with the module opening (M) in the metal layer 902

The discontinuity (slit S) in the metal layer may be disguised or masked with baked-on ink and a plurality of coatings applied to the metal layer. An adhesion promoter or primer may be first applied to the metal layer, followed by a coating (or sealant) and an ink layer applied to the coated surface, and further protected by a top-coat layer. The coatings and ink(s) are cured at an elevated temperature. The coating and protective polymers may be a blend of polyurethane and polyester, or an acrylic base coating. The gloss level (low or high) depends on the quality and smoothness of the metal surface, the color of the baked-on ink, the amount and type of coatings applied and the use of any dulling agents. The primer and ink may be applied at a defined viscosity. FIG. 9A is a perspective view of the different layers applied to a metal surface (metal inlay) disguising the presence of a discontinuity by using primer, polymer coatings (synthetic resin) and ink.

The assembly of the different layers to the metal surface (metal inlay) in FIG. 9A represents the top section in the stack-up construction of a dual interface metal smartcard (SC). Not shown are the layers which form the bottom section in the stack-up construction which include an adhesive layer, printed synthetic layer and an overlay layer with magnetic stripe.

A UV hard coat layer on a release-carrier layer may be further laminated to the top-coat layer (protective polymer coating). The UV hard coat layer may be laser engravable. The top-coat layer may be laser engravable. The first coating or sealant (polymer coating) on the primer may be omitted. The UV hard coat or diamond coat layer may be a clear, matte or have a mechanical brush effect.

In the embodiment of FIG. 9A, after the primer (903), ink layer (908) and top coated layer (909) are baked onto the metal inlay with an array of card body sites each with a slit, the metal inlay with baked-on-ink and a top coat for scratch protection can be further processed with digital printing of ink to the top coat layer and further protected by a layer of varnish/ink. The additional ink layer may be further divided into two printed ink layers separated by a clear ink layer (not shown).

In the illustration of FIG. 9A, baked-on ink has been emphasized, but equally any other form of ink and its deposition, coating or printing could equally be applicable.

As a general proposition, having a single meal layer with a slit, such as described in FIG. 9A, may not be optimal, since the slit may short out when the card is flexed, particularly if the slit is a micro-slit. Hence, FIGS. 9B,C,D illustrate an alternate construction for a smartcard (SC) wherein a second, underlying, supporting metal layer with a slit is provide. The two metal layers (i.e., a front face metal layer with a slit, and the underlying supporting metal layer with a slit) should be insulated from one another, by any suitable means, such as by a dielectric layer with adhesive on both sides. Moreover, the slits in the two metal layers should be located at different positions and/or orientations than one another, such as suggested in U.S. Pat. No. 9,836,684 (attention is directed to FIG. 15B, therein).

FIG. 9B is a perspective view of the different layers in the stack-up construction of a metal face smartcard (SC) 900B with the front face metal layer having a shaped slit (S) starting at a perimeter edge of the metal card body (MCB) and ending at the module opening to function as a coupling frame (CF), with the front face metal layer coated with an adhesion promoter or primer, followed by the selective application of ink to print a filigree pattern and graphic elements on the coated metal surface, disguising the presence of the shaped slit behind the printed artwork, with the printed artwork protected by a coating of varnish or ink, and on top thereof raised characters (embossed) above the surface of the card are digitally printed. The front face metal layer with a shaped slit is mechanically reinforced by an underlying supporting metal layer with a slit which is offset from the slit in the front face metal layer, and the supporting metal layer is electrically separated from the front face metal layer by a dielectric layer with double-sided adhesive to bond both of the (front face, supporting) metal layers together. The shaped slit in the front face metal layer may be filled with an epoxy or resin prior to assembly with the supporting metal layer.

FIG. 9B, described briefly hereinabove, shows the construction of a smartcard (SC) 900B, having the following stack-up of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)
    . . . working upward from the front face metal layer 902 . . .
    904 primer layer
      * note that before or after the prime layer is applied, a coating or sealant may be introduced to fill the slit.
    908 ink layer
      * the positions of 904 and 908 may be interchanged with one another
    912 protective varnish or ink layer
    910 ink layer with raised alphanumeric characters
    914 personalization/laser engraving operation
    . . . working downward from the front face metal layer 902 . . .
    920 dielectric layer with adhesive on both sides
    922 supporting metal layer (ML), with slit (S)
    924 adhesive layer
    926 synthetic layer with artwork
    928 laser-engravable overlay with magnetic stripe (and signature panel)

An additional clear layer may be introduced between printed layers. A clear layer may be disposed over an ink layer, and printed upon. A clear layer may be flexible ink, and may have a thickness of 8-10 μm.

In the embodiment of FIG. 9A, after the primer (903), ink layer (908) and top coated layer (909) are baked onto the metal inlay with an array of card body sites each with a slit, the metal inlay with baked-on-ink and a top coat (909) for scratch protection can be further processed with digital printing of ink to the top coat layer (909) and further protected by a layer of varnish. The additional ink layer may be further divided into two printed ink layers separated by a clear ink layer (not shown).

Note that the layers 920-928, behind the front face metal layer 902 may be the same as shown in FIG. 9B, and may be added below the metal layer 902 in FIG. 9A.

The stack-up construction of a metal face smartcard may be as follows:

---

Personalization 914
    Laser engraving of intended cardholder data
Raised Alphanumeric Characters 910
    Post Lamination Varnish (PLV) -
    Digitally printed hard ink (0.2-1.0 mil)
Protective Varnish or Ink Layer 912
    Coated or Silk Screen Printed UV Protective Varnish or
    Ink - Gloss, satin, matte finish (~0.5 mil)
    Before or after PLV
Ink Layer 908
    Digitally Printed UV Ink -
    Fine ornamental background, border, and overprint of
    graphic features and texture
    (note the ink layer may be divided up into several ink
    layers separated by a clear ink layer)
Adhesion Promoter/Primer Layer 904
    Underlying Adhesion Promoter or Primer -
    Absorbed onto the surface of the front face metal layer
    (UV ink and bonding agent: 0.6-0.8 mils)
Front Face Metal Layer with Shaped Slit 902
    12 mils Stainless Steel with a Shaped Slit -
    Epoxy or resin filled slit for visual effect and or
    mechanical reinforcement
    Surface of the stainless-steel layer may be raw, grain
    structured, pickled or electropolished
Dielectric Layer 920
    Double-sided Thermosetting Epoxy on a PEN Carrier -
    Insulating layer between the front face metal layer and
    the supporting metal layer (3 mils)
Supporting Metal Layer with Slit 922
    6 mils Stainless Steel with an Offset Slit -
    Structural reinforcement of front face metal layer with
    shaped slit
Adhesive Layer 924
    Free Standing Thermosetting Epoxy (1 mil)
Synthetic Layer with Artwork 926
    5 mils Printed PVC Laminate -
    Combination of lithographically offset printed PMS
    (Pantone Matching System) colors and silk screen
    printed solvent inks
Outermost Layer 928
    2.5 mils Laser Engravable Overlay with Magnetic Stripe
Total Thickness of Card Body Pre-Lamination: ~31.3 mils or 795 μm
ISO 7810 Card thickness tolerance: 0.84 mm (max) and 0.68 (min)

---

The slit may be filled with a UV curing epoxy or a two-component adhesive, dispensed as a microfluidic droplet for in situ bonding of the slit under pressure/vacuum control.

Instead of filling the slit with an epoxy or resin in the front face metal layer (12 mils stainless steel layer), a primer may be first applied to the stainless steel layer followed by a digitally printed UV curing ink selectively deposited around the area of the slit to camouflage its presence, further discussed in detail below.

Instead of printing the background and graphic elements, the features may be directly lasered into the metal. The metal may also be coated with a baked-on ink layer.

The coated or silk screen printed UV protective varnish or ink layer may be replaced by a UV hard coat layer.

The printing techniques of drop on demand (digital deposition), lithographic offset and silk screen printing as described above are interchangeable.

The post lamination varnish (PLV) may include the printing of graphic features and borders.

The shaped slit in the front face metal layer may be filled with an epoxy or resin, may be sealed with an adhesion promoter or primer, and camouflaged with ink or artwork The surface of the metal inlay may be pretreated with a catalyzed screen ink and when cured forms a hard heat and chemical resistant film which can be produced in a gloss or matt finish depending on the hardener or additives used. The hardener determines the viscosity of the ink and may fill and cover the slit after application.

As shown in FIG. 9A, the stack-up of the smartcard (SC) 900 may be, from bottom (rear) to top (front):

902 metal layer (ML) having a module opening (MO) and a slit (S)
  MO—module opening (MO) in the metal layer for receiving a TCM (not shown)
  S—slit (S) extending from an edge portion of the metal layer to the module opening
  The metal layer with module opening and slit functions as a coupling frame (CF)
903 clear primer layer over the metal layer
907 coating or sealant over the primer layer
908 baked-on ink layer
909 top coat layer
  Each of the layers 903, 907, 908, 909 may have a module opening aligned with the module opening (M) in the metal layer 902

As shown in FIG. 9B, the stackup for a smartcard (SC) 900B may be as follows: starting with a 902 metal layer (ML) having a module opening (MO) and a slit (S) stacked atop the metal layer 902, the following:
904 primer layer
908 ink layer
  * note that the positions of 904 and 908 may be interchanged with each other
912 protective varnish or ink layer
910 ink layer with raised alphanumeric characters
914 personalization/laser engraving operation to protective varnish layer
stacked below the metal layer 902, the following:
920 dielectric layer with adhesive on both sides
922 supporting metal layer (ML), with slit (S)
924 adhesive layer
926 synthetic layer with artwork
928 laser-engravable overlay with magnetic stripe (and signature panel)

A baked on ink layer to the metal layer may be replaced by a PVD or DLC coating on the metal layer. Information may be digitally printed on its surface and protected by a clear coat of ink or varnish.

Laser personalization of laser-reactive layers such as the UV hard coat layer in which card holder information is scribed into its surface, may be influenced by the underlying color of the printed ink with darker colors having higher UV absorption, resulting in ablation of the ink from the metal, giving a three dimensional effect to the characters scribed by laser.

The laser engraving disclosed herein can be performed with either a UV laser or an IR laser.

FIG. 9C shows a variation in the stack-up construction of FIG. 9B, interchanging the position of the ink layer bearing the embossed alphanumeric characters, with the protective varnish or ink layer as the final outer layer in the smartcard assembly before personalization.

FIG. 9C, described briefly hereinabove, shows the construction of a smartcard (SC) 900C, having the following stack-up of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)
  . . . working upward from the front face metal layer 902 . . .
904 primer layer
  * note that before or after the prime layer is applied, a coating or sealant may be introduced to fill the slit.
908 ink layer
  an additional clear ink layer (not shown) may be disposed atop the previous ink layer 908
910 ink layer with raised alphanumeric characters (absent from the construction of FIG. 9B)
  * note that the ink layer 910 may be optional
912 protective varnish or ink layer
  * note that the layers 910 and 912 are reversed from what was shown in FIG. 9B
914 personalization/laser engraving operation
  . . . working downward from the front face metal layer 902 . . .
920 dielectric layer with adhesive on both sides
922 supporting metal layer (ML), with slit (S)
924 adhesive layer
926 synthetic layer with artwork
928 laser-engravable overlay with magnetic stripe (and signature panel)

Note that the layers 920-928, behind the front face metal layer 902 may be the same as shown in FIG. 9B, and may be added below the metal layer 902 in FIG. 9A.

In the embodiments of FIGS. 9B and 9C, the first ink layer (908) disposed on the primer layer (904) may be divided into two printed ink layers, one carrying graphical artwork while the other carrying other features and information, separated by a clear ink layer (not shown).

Techniques to Camouflage a Discontinuity in a Metal Layer

As discussed above and in the prior art, a discontinuity in a metal layer may be camouflaged with (i) an epoxy or resin filling the slit; (ii) a primer and a coating layer applied to a micro-slit (~50 μm) and overprinted with CMYK ink, (iii) applying a metal foil laminate to a metal layer or metal inlay with an array of card body sites, and or (iv) applying a transparent or translucent synthetic layer to the metal layer with slit.

Equally, a discontinuity in a metal layer can be optically disguised or concealed by a metallic ink layer, a pearl ink layer, a metallic brush effect, or mechanical brush effect in the design of the ink. This may be considered as a concealing ink layer.

Some techniques for disguising or camouflaging a slit may be "borrowed" from U.S. Pat. No. 5,413,814 (1995

May 9; Bowen et al.) which discloses techniques for coating articles to have the appearance of wood, leather or other naturally occurring materials.

Metallic Ink and Non-Conductivity

Metallic ink is a varnish or vehicle containing metallic particles. Common metals used to manufacture metallic ink include copper, aluminum, bronze or zinc. When metallic ink is printed and left to dry, the metallic particles rise to the surface, reflecting light and creating a metallic sheen. Metallic inks create a similar, but less intense, effect than foil stamping because they are applied as paste or liquid ink, versus a thin sheet of metal foil applied directly on top of a substrate.

It is important to note that metallic inks are opaque, whereas conventional process inks (cyan, magenta, yellow and black) are transparent.

The metallic ink may be deposited on a metal surface or a pretreated/coated metal surface and selectively made conductive by exposure to light radiation (photo-sintering).

Reference is made to U.S. Pat. No. 10,231,344 which discloses a metallic ink forming a conductive film comprising depositing a non-conductive film on a surface of a substrate, wherein the film contains a plurality of copper nanoparticles and exposing at least a portion of the film to light to make the exposed portion conductive. Exposing of the film to light photosinters or fuses the copper nanoparticles.

Electrical resistance value of normal metallic inks is about $10^{4-5}\Omega$, while the electrical resistance of non-conductive metallic ink is over $10^9\Omega$.

Generally, metallic ink may be applied to a metal surface with a slit, covering the metal surface including filling the slit. The ink is cured with intense light radiation which causes nanoparticles in the ink to become conductive, but at those areas (e.g., in the slit) where the intense light radiation is not applied, the ink cures in an atmospheric environment, and the area (e.g., the slit) remains non-conductive because the nanoparticles have not bonded together.

Light-curable, metallic ink containing nanoparticles may also be blanket deposited on a metal surface, then selectively exposed to high intensity light to form conductive patterns, such as lines or traces, in a manner similar to forming patterns in photoresist for semiconductor or printed circuit board fabrication. This technique can be used to form some of the antenna structures described herein.

Pearl Ink

Pearlescent inks producing a shimmering pearl effect may be used as a replacement for a metallic ink.

Reference is made to U.S. Pat. No. 6,749,123 (2004 Jun. 15; Lasch et al., Amex) which discloses the printing of pearl ink in producing a transaction card. The exemplary ink gradient for each card is printed using known printing inks suitably configured for printing on plastic, such as Pantone colors. In an exemplary embodiment of U.S. Pat. No. 6,749,123, the ink used for the stippling is a silver pearl ink and is applied to the outside surface of each plastic sheet. Ink gradient is printed on the surface of each of the sheets using a silk screen printing process which provides an opaque, heavier ink coverage or using offset printing process which provides halftone images in finer detail. The words "American Express" are printed in Pantone 8482 using a similar silkscreen process.

Pearl Ink Printing

Pearlescent pigments are often employed in printing inks to create impressionable and appealing smartcards, since they provide both natural pearl shine and the effect of goniochromism. With respect to their interaction with light, the pigments used in printing inks can be divided into absorption and effect pigments. The latter have become increasingly important in graphic arts industry because of their ability to create the range of optical effects—the effect of metals, shine, change of perceived color with the change of viewing angle or the angle of illumination (effect knows as goniochromism) etc. Pearlescent pigments belong to the special effect pigments due to their goniochromatic properties, as well as the possibility to produce the effect of pearl luster.

Pearl silver inks are non-conductive and can replace metallic inks in contactless transaction cards.

A pearl silver ink may be a moisture curing ink which cures over many days (typically 3 to 5 days) or may be a hybrid mixture of the ink and an additive (catalyst) in a ratio of parts e.g. four to one, and a primer applied to the metal surface may not be required. The pearl ink may be comprised of aluminum nanoparticles and may be used to fill or camouflage a slit.

Mechanical Brush Effect

Digitally printing a fake mechanical brush effect on metal optically distorts the visibility of an underlying micro slit. The metallic grain effect can be achieved in the graphic design settings such as the gradient direction for metallic texture, distribution, noise, motion blurriness, foreground color and brush opacity.

A plethora of other inks used in the smartcard industry could be used to hide a discontinuity in a metal layer as well as the application of the ink can play a crucial role.

FIG. 9D shows a further variation in the stack-up construction of FIG. 9C with the addition of a concealing ink layer hiding the presence of the underlying slit. The concealing ink layer is electromagnetic transparent and does not attenuate the field generated by the contactless POS terminal. The concealing ink may be a metallic ink (non-conductive around the area of the slit), a pearl silver ink having poor electrical conductivity, or the concealing ink layer may be achieved by a mechanical brush effect accomplished by artwork design using drop on demand printing.

FIG. 9D, described briefly hereinabove, shows the construction of a smartcard (SC) 900D, having the following stack-up of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)
  . . . working upward from the front face metal layer 902 . . .
  904 primer layer
  * note that before or after the prime layer is applied, a coating or sealant may be introduced to fill the slit.
  906 concealing ink layer (absent from the construction of FIG. 9C)
  908 ink layer
  * note that the layers 906 and 908 could be positionally interchanged
  910 ink layer with raised alphanumeric characters (absent from the construction of FIG. 9B)
  * note that the ink layer 910 may be optional
  912 protective varnish or ink layer
  914 personalization/laser engraving operation . . . working downward from the front face metal layer 902 . . .

920 dielectric layer with adhesive on both sides
922 supporting metal layer (ML), with slit (S)
924 adhesive layer
926 synthetic layer with artwork
928 laser-engravable overlay with magnetic stripe (and signature panel)

Note that the layers 920-928, behind the front face metal layer 902 may be the same as shown in FIGS. 9B and 9C, and may be added below the metal layer 902 in FIG. 9A.

In the embodiment of FIG. 9D, the concealing ink layer (906) and the first ink layer (908) disposed on the primer layer (904) may also be separated by a clear ink layer (not shown).

FIG. 9E is a front view of a metal face smartcard with a shaped slit commencing at a top corner peripheral edge of the card body, disappearing under the printed border disguising its presence, with the slit descending downwards behind the border to a center position before crossing over to a module opening (MO). The laser cut slit may be 50 µm wide and may be only visible from a certain angle. The slit may be filled with a clear adhesion promoter or primer before ink printing, to further disguise its presence.

The decorative features may be post lamination varnish accomplished through digital printing of flexible and hard inks.

FIG. 9F is a detailed view of the shaped slit in the front face metal layer, its disappearance under the printed border, and its exposure or visibility at the edge of the card body and at the area around the module opening (MO).

FIG. 9G is a detailed view of the non-exposed slit in the front face metal layer after the deposition of a concealing ink layer to the surface of the metal.

In summary, the strategy to camouflage or disguise a discontinuity in a front face metal inlay with an array of card bodies, in producing metal face smartcards is to: (i) fill the slit with an epoxy or resin at each card body site in the metal inlay for electrical isolation; (ii) reinforce the mechanical robustness by adhesively attaching a supporting metal inlay with offset positioned slits to the front face metal inlay; (iii) prime the metal inlay surface with an adhesion promoter or primer; (iv) hide the existence of the underlying slits with a concealing ink layer comprising of CMYK ink, metallic ink, pearl silver ink or with a fake design such as a mechanical brush effect. To retain the drop acoustics of a metal sound, thermosetting epoxy adhesive is used to join the metal layers, and to attach a metal layer to a synthetic layer. In short, fill for electrical isolation, support for mechanical reinforcement, prime for ink adhesion, conceal with ink and design effects for camouflage and protect with a coating (varnish or ink) for surface enhancement and longevity.

FIG. 9A is illustrative of the following process steps (method): laser cut slits and openings in a front face metal layer for an antenna circuit at each card body site in an array forming a metal inlay; prime the surface of the front face metal inlay for coating adhesion; fill or seal the slits with a coating for electrical insulation while covering the entire area of the metal inlay; print ink on the coated front face metal inlay for color and graphics while simultaneously concealing the slits with design effects for camouflage; protect the printed artwork with a top coating for surface enhancement and longevity; optionally support the front face metal inlay with a second metal inlay having offset positioned slits using thermosetting epoxy on both sides of a dielectric for mechanical reinforcement; followed by lamination of the synthetic layers, mechanical engraving of logos to the front face metal inlay, and metal card body singulation; before personalizing with laser engraving of card holder data.

The ink and coating may be applied and baked on before the second metal inlay is attached or after it is attached. The top coating can be further protected with a UV hard coat or diamond coat. The top coating may be replaced by the UV hard coat. The UV hard coat may be clear, matte, or have a mechanical brush effect.

The ink and coatings applied to the metal inlay and baked on at an elevated temperature may be further processed with the application of digital printing to the top coat and the artwork protected by a layer of varnish or ink.

FIGS. 9B and 9C are illustrative of the following process steps (method): laser cut slits and openings in a front face metal layer for an antenna circuit at each card body site in an array forming a metal inlay; fill or seal the slits with an epoxy, resin or coating for electrical insulation; support the front face metal inlay with a second metal inlay having offset positioned slits using thermosetting epoxy on both sides of a dielectric (carrier) layer for mechanical reinforcement; prime the surface of the front face metal inlay for ink adhesion; print ink on the front face metal inlay for color and graphics as well as to disguise the presence of the slits; protect the printed artwork with a top coating for surface enhancement and longevity; followed by lamination of the synthetic layers and metal card body singulation; before personalizing with data of the intended card holder by means of laser engraving and or printing. A hologram may be hot-stamped to the top coating.

FIG. 9D is illustrative of the following process steps (method): laser cut slits and openings in a front face metal layer for an antenna circuit at each card body site in an array forming a metal inlay; fill or seal the slits with an epoxy, resin or coating for electrical insulation; support the front face metal inlay with a second metal inlay having offset positioned slits using thermosetting epoxy on both sides of a dielectric (carrier) layer for mechanical reinforcement; prime the surface of the front face metal inlay for ink or coating adhesion; conceal the slits with ink and design effects for camouflage; print ink on the front face metal inlay for color and graphics; protect the printed artwork with a top coating for surface enhancement and longevity; followed by lamination of the synthetic layers and metal card body singulation; before personalizing with data of the intended card holder by means of laser engraving and or printing. A hologram may be hot-stamped to the top coating.

Embossed characters or graphics may be applied before or after the application of the protective varnish or ink layer (top coating) by the process of post lamination varnish. The concealing ink layer may comprise of CMYK ink, metallic ink, pearl silver ink or with a fake design effect such as a mechanical brush. A non-attenuating metal foil layer may be applied to the front face metal inlay surface to cover the slits. A UV hard coat layer may be laminated to the protective varnish or ink layer or may replace the protective varnish or ink layer.

FIG. 9H is a variation of FIG. 9A with the following stack-up construction:

The stack-up of the card 900H may be, from bottom (rear) to top (front):

902 metal layer (ML) having a module opening (MO) and a slit (S)

MO—module opening (MO) in the metal layer for receiving a TCM (not shown)

S—slit (S) extending from an edge portion of the metal layer to the module opening The metal layer with module opening and slit functions as a coupling frame (CF)
903 clear primer layer over the metal layer
907 coating or sealant over the primer layer
908 baked-on ink layer
909 top coat layer
Each of the layers 903, 907, 908, 909 may have a module opening aligned with the module opening (M) in the metal layer 902

In addition to FIG. 9A, the following layers and printing procedures and coatings are applied:
904 primer layer
908 ink layer
912 protective lacquer, varnish or ink layer (which is laser engravable)
910 ink layer with raised alphanumeric characters
personalization/laser engraving operation to protective varnish layer
Laser treatment can be ultraviolet, infrared or green
Below the 902 metal layer (ML):
920 dielectric layer with adhesive on both sides
922 supporting metal layer (ML), with slit (S)
924 adhesive layer
926 synthetic layer with artwork
928 laser-engravable overlay with magnetic stripe (and signature panel)

Filling or Sealing a Slit in a Metal Inlay for Electrical Isolation Versus Increasing the Width of the Slit to Avoid Electrical Shorting There is a trade-off between using a narrow slit or micro-slit (~50 µm) to hide the presence of a discontinuity in a metal card body, and widening the width of the slit to avoid electrical shorting when the metal card is flexed or bent during insertion in a POS terminal, resulting in the edges of the slit converging and touching. To avoid shorting, a narrow slit in a metal inlay can be filled with an epoxy or resin, a slit in a metal inlay can be primed and sealed with a non-conductive medium using a digital printing press to dispense a polymer coating, or a slit in a metal inlay can be filled with an adhesive epoxy as a result of the lamination of the card assembly under pressure, temperature and dwell time, with the epoxy flowing into, filling and curing within the slit.

The alternative is to diverge away from the narrow slit and widen the slit, but with the downside that its presence becomes more noticeable, and the subsequent camouflaging mechanisms to disguise the wider slit are more elaborate.

CNC Milling

Typically, cards may be manufactured (laid up and laminated) in sheet form, each sheet having a plurality of cards, such as in a 5×5 array, and CNC (computer numerical control) machining may be used to singulate (separate) the finished cards from the sheet. Resulting burrs, particularly in the metal layers, may cause defects, such as electrical shorting of the slit. Hence, CNC machining of metal core, metal face or solid metal smartcards may be performed using cryogenic milling, such as in an environment of frozen carbon dioxide or liquid nitrogen.

SOME ADDITIONAL COMMENTS

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

Generally, in order for the smartcard to be "RFID-enabled" (able to interact "contactlessly"), each of the one or more metal layers should have a slit, or micro-slit. When there are two (or more) metal layers with slits in the stack-up, the slits in the metal layers should be offset from one another.

Some Generic Characteristics of Smartcards

The smartcards described herein may have the following generic characteristics:

The card body may have dimensions similar to those of a credit card. ID-1 of the ISO/IEC 7810 standard defines cards as generally rectangular, measuring nominally 85.60 by 53.98 millimeters (3.37 in×2.13 in).

A chip module (RFID, contact type, or dual interface) may be implanted in a recess (cavity, opening) in the card body. The recess may be a stepped recess having a first (upper, P1 portion) having a cavity depth of 250 µm, and a second (lower, P2 portion) having a cavity depth of (maximum) 600 µm.

A contact-only or dual interface chip module will have contact pads exposed at a front surface of the card body.

ISO 7816 specifies minimum and maximum thickness dimensions of a card body:
Min 0.68 mm (680 µm) to Max 0.84 mm (840 µm) or Min 0.027 inch to Max 0.033 inch Generally, any dimensions set forth herein are approximate, and materials set forth herein are intended to be exemplary. Conventional abbreviations such as "cm" for centimeter", "mm" for millimeter, "µm" for micron, and "nm" for nanometer may be used.

The concept of modifying a metal element of an RFID-enabled device such as a smartcard to have a slit (S) to function as a coupling frame (CF) may be applied to other products which may have an antenna module (AM) or transponder chip module (TCM) integrated therewith, such as watches, wearable devices, and the like.

Some of the features of some of the embodiments of RFID-enabled smartcards may be applicable to other RFID-enabled devices, such as smartcards having a different form factor (e.g., size), ID-000 ("mini-SIM" format of subscriber identity modules), keyfobs, payment objects, and non-secure NFC/RFID devices in any form factor The RFID-enabled cards (and other devices) disclosed herein may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors.

The transponder chip modules (TCM) disclosed herein may be contactless only, or dual-interface (contact and contactless) modules.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention (s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A smartcard comprising a stackup of:
a metal component which is a metal core or a metal face for the card, said metal component comprising one or more metal layers layer(s) having a slit enabling contactless functionality of the card, and wherein the metal component has a top side and a bottom side; and
a protective layer which is UV hard coat (film) or a hard coating (screen-printed lacquer/ink/varnish) layer disposed over and protecting the metal component;
further comprising:
a front transparent laser-reactive layer with printed information and graphics disposed on the top side of the metal component, between the protective layer and the metal component; and
a rear plastic laser-reactive layer with printed information and graphics disposed on the bottom side of the metal component.

2. The smartcard of claim 1, wherein:
the protective layer is laser-reactive.

3. The smartcard of claim 1, wherein:
when the stackup for the card is laminated, the protective layer imparts a non-scratch gloss or matte finish to the front transparent laser-reactive layer.

4. The smartcard of claim 1, wherein:
the front transparent laser-reactive layer has an adhesive backing and comprises a plastic layer of clear PVC, PC or PETG or any suitable synthetic material which is receptive to digital printing on its reverse side.

5. The smartcard of claim 1, wherein:
the front transparent laser-reactive layer with a UV hard coat layer is adapted to be personalized by a laser beam, without damaging the hard coat layer during the laser etching process.

6. The smartcard of claim 1, wherein:
the rear plastic laser-reactive layer is transparent, translucent, white or colored PVC, PC, PETG or any suitable synthetic material which is receptive to ink, and includes a magnetic stripe.

7. The smartcard of claim 1, wherein:
the metal component includes a baked-on coating of primer, ink and a finish which camouflages the slit.

8. The smartcard of claim 1, wherein:
the protective layer is a UV hard coat layer supported by a release-carrier layer which is removed after the layers are laminated together to form a completed assembly.

9. The smartcard of claim 1, further comprising:
a transponder chip module (TCM) having a chip and an antenna configured to couple with the metal component so as to enable radio frequency communication with a contactless point of sale terminal.

10. A method of manufacturing a smartcard, comprising:
providing a metal core comprising at least one metal layer having a slit and an opening for a transponder chip module;
disposing a front plastic layer on a front surface of the metal core;
disposing a rear plastic layer on a rear surface of the metal core;
disposing a hard coat layer which is carried by a release-carrier layer on one or both of the front and rear plastic layers; and
laminating the metal core, front plastic layer, rear plastic layer and hard coat layer(s) on release-carrier layer(s) in a single laminating step.

11. The method of claim 10, wherein:
the laminating step is performed at a predetermined temperature, pressure and dwell time such that the hard coat layer imparts a protective finish to the front or rear surface(s) of the card.

12. The method of claim 10, further comprising:
after laminating, removing the release-carrier layer.

13. The method of claim 10, further comprising:
providing a number of clear PVC layers in a stackup for the card construction; and
selectively exposing portions of the clear PVC layers to a laser beam for the engraving of card credentials.

14. The method of claim 10, further comprising:
providing a magnetic strip and security elements a back surface of the card.

15. The method of claim 10, further comprising:
providing graphics for camouflaging the presence of a slit in the metal layer or layers.

16. The method of claim 10, further comprising:
a transponder chip module having at least contactless capability disposed in the card.

* * * * *